United States Patent
Mobasher et al.

(10) Patent No.: US 8,964,871 B2
(45) Date of Patent: Feb. 24, 2015

(54) CODEBOOK BASED DOWNLINK MULTI-USER INTERFERENCE ALIGNMENT SCHEME

(71) Applicant: BlackBerry Limited, Waterloo (CA)

(72) Inventors: Amin Mobasher, Sunnyvale, CA (US); Alireza Bayesteh, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 11 days.

(21) Appl. No.: 13/739,420

(22) Filed: Jan. 11, 2013

(65) Prior Publication Data

US 2013/0301746 A1    Nov. 14, 2013

Related U.S. Application Data

(60) Provisional application No. 61/646,623, filed on May 14, 2012.

(51) Int. Cl.
*H04B 7/02* (2006.01)
*H04B 7/04* (2006.01)
(Continued)

(52) U.S. Cl.
CPC .............. *H04B 7/0456* (2013.01); *H04B 7/024* (2013.01); *H04B 7/0452* (2013.01);
(Continued)

(58) Field of Classification Search
CPC .. H04B 7/0417; H04B 7/0452; H04B 7/0634; H04B 7/0639; H04B 7/024; H04B 7/0456; H04B 1/10; H04B 7/0486; H04B 7/022; H04B 7/0413; H04B 7/0628; H04B 7/0632; H04B 7/0654; H04B 7/0665; H04B 7/0421; H04B 7/063; H04B 7/0641; H04B 7/0643; H04B 7/06

See application file for complete search history.

(56) References Cited

U.S. PATENT DOCUMENTS 5,852,630 A * 12/1998 Langberg et al. ............. 375/219
8,325,841 B2 * 12/2012 Lee et al. ...................... 375/267
(Continued)

FOREIGN PATENT DOCUMENTS

CN    101394254 A    3/2009
CN    101459461 A    6/2009
(Continued)

OTHER PUBLICATIONS

Extended European Search Report for Application No. 13167278.4-1852, dated Oct. 7, 2013, pp. 1-8.
(Continued)

*Primary Examiner* — Hirdepal Singh
(74) *Attorney, Agent, or Firm* — Conley Rose, P.C.; J. Robert Brown, Jr.

(57) ABSTRACT

A method for operating a receiver having multiple receive antennas to process a signal from a first affiliated transmitter and align interference from a second interfering transmitter includes providing a codebook of predefined matrices. Each predefined matrix has an identifier associated therewith. A first channel matrix and a second channel matrix are assembled for the first and the second transmitters. An equivalent direct channel matrix is determined from the first and second channel matrices, and predetermined reference vectors are selected from a plurality of predetermined vectors. A predefined matrix is selected from the codebook based upon the equivalent direct channel matrix and an identifier for the predefined matrix is fed back to the first transmitter. A signal is received and decoded using a combining matrix derived from the predetermined reference vectors and an inverse of the second channel matrix, thereby reducing interference from the interfering transmitters.

42 Claims, 7 Drawing Sheets

(51) Int. Cl.
*H04L 25/03* (2006.01)
*H04L 25/02* (2006.01)

(52) U.S. Cl.
CPC ..... *H04L 25/03898* (2013.01); *H04L 25/0204* (2013.01); *H04L 25/0248* (2013.01); *H04L 25/03949* (2013.01); *H04L 25/0228* (2013.01)
USPC .......... 375/267; 375/260; 375/262; 375/295; 375/316; 375/342

(56) References Cited

U.S. PATENT DOCUMENTS

| | | | |
|---|---|---|---|
| 8,767,843 B2 * | 7/2014 | Sayana et al. | 375/260 |
| 2005/0176436 A1 | 8/2005 | Mantravadi et al. | |
| 2006/0269023 A1 | 11/2006 | Chimitt et al. | |
| 2010/0034146 A1 * | 2/2010 | Hou et al. | 370/328 |
| 2010/0104037 A1 | 4/2010 | Jongren | |
| 2010/0227613 A1 | 9/2010 | Kim et al. | |
| 2010/0232528 A1 | 9/2010 | Li et al. | |
| 2010/0265813 A1 | 10/2010 | Pereira et al. | |
| 2011/0034135 A1 | 2/2011 | Ali et al. | |
| 2011/0051837 A1 * | 3/2011 | Park et al. | 375/285 |
| 2011/0176629 A1 | 7/2011 | Bayesteh et al. | |
| 2011/0200126 A1 | 8/2011 | Bontu et al. | |
| 2011/0200131 A1 | 8/2011 | Gao et al. | |
| 2011/0222469 A1 | 9/2011 | Ali et al. | |
| 2011/0261745 A1 | 10/2011 | Bontu et al. | |
| 2012/0046038 A1 * | 2/2012 | Gao et al. | 455/447 |
| 2013/0322361 A1 * | 12/2013 | Ko et al. | 370/329 |
| 2014/0056156 A1 * | 2/2014 | Jongren | 370/252 |
| 2014/0072065 A1 * | 3/2014 | Nammi | 375/267 |

FOREIGN PATENT DOCUMENTS

| | | |
|---|---|---|
| CN | 101615942 A | 12/2009 |
| CN | 101919171 A | 12/2010 |
| WO | 2008081715 A1 | 7/2008 |

OTHER PUBLICATIONS

International Preliminary Report on Patentability dated Aug. 15, 2013 for PCT Application No. PCT/IB2011/050426, pp. 1-7.
International Preliminary Report on Patentability dated Aug. 15, 2013 for PCT Application No. PCT/IB2011/050427, pp. 1-6.
International Preliminary Report on Patentability dated Aug. 15, 2013 for PCT Application No. PCT/IB2011/050428, pp. 1-6.
International Search Report and Written Opinion dated Nov. 2, 2011 for PCT Application No. PCT/IB2011/050427, pp. 1-9.
International Search Report and Written Opinion dated Nov. 2, 2011 for PCT Application No. PCT/IB2011/050428, pp. 1-9.
Shin et al., "Interference alignment through user cooperation for two-cell MIMO interfering broadcast channels", Globecom Workshops (GC Wkshps), 2010 IEEE, Dec. 6, 2010, pp. 120-125.
Cadambe, V. R., et al.; "Interference Alignment and Spatial Degrees of Freedom for the K Usere Interference Channel"; IEEE International Conference on Communications 2008; p. 971-975; May 23, 2008.
International Search Report and Written Opinion dated Oct. 17, 2011 for Application No. PCT/IB2011/050426; pp. 1-10.
Viveck R. Cadambe, et al,"Interference Alignment and Degrees of Freedom of the K-User Interference Channel," IEEE Transactions on Information Theory, vol. 54, No. 8, pp. 3425-3441; Aug. 2008.
Onur Ozan Koyluoglu et al., "Interference Alignment for Secrecy," IEEE International Symposium on Information Theory, pp. 1-15, 2008.
Mohammad Ali Maddah-Ali, et al,"Communication Over MIMO X Channels:Interference Alignment, Decomposition, and Performance Analysis," IEEE Transactions on Information Theory, vol. 54, No. 8, pp. 1-14; Aug. 2008.
Chenwei Wang, "Aiming Perfectly in the Dark—Blind Interference Alignment Through Staggered Antenna Switching," School of Information Theory, USC, pp. 1-12, Aug. 2010.
Suh, Changho, et al.; "Downlink Interference Alignment"; IEEE Globecom 2010; p. 1-5; Dec. 10, 2010.

* cited by examiner

CODEBOOK BASED DOWNLINK MULTI-USER INTERFERENCE ALIGNMENT SCHEME

CROSS-REFERENCE TO RELATED APPLICATION

This application is a non-provisional of U.S. patent application Ser. No. 61/646,623, filed May 14, 2012, the disclosure of which is incorporated by reference herein in its entirety.

BACKGROUND

The present disclosure relates generally to communications systems and, more particularly, to a codebook based interference alignment scheme for use in a wireless communication system.

One of the major challenges in wireless communication systems is to overcome interference caused by other users, such as when a mobile device in cellular systems receives interfering signals from multiple transmitters. Traditional schemes attempt to manage interference as noise or by orthogonalizing channel resources between different transmitters (base stations or access points) by assigning different frequency channels, time slots, or codes to different resources (e.g., frequency division multiple access (FDMA)/time division multiple access (TDMA)/code division multiple access (CDMA)). In addition, concurrent transmission techniques (interference alignment (IA)) have been proposed in which multiple senders jointly encode signals to multiple receivers so that interference is aligned and each receiver is able to decode its desired information.

Interference alignment provides better performance than orthogonalization-based schemes by aligning the interference at a receiver coming from different sources in the least possible spatial dimensions to maximize the number of interference-free dimensions, thus providing more degrees of freedom for signal transmission and improving the throughput performance. With interference alignment, a transmitter can partially or completely "align" its interference with unused dimensions of the primary terminals, thereby maximizing the interference-free space for the desired signal in an interference channel. For example, it has been shown that all the interference can be concentrated roughly into one half of the signal space at each receiver, leaving the other half available to the desired signal and free of interference. When considering sum capacity for n users in the high SNR regime, the sum capacity for each transmitter scaling as n/2 log(SNR) is achievable which is equivalent to n/2 degrees of freedom for the sum capacity for each transmitter. Moreover, for fixed SNR values, the sum capacity achieved by interference alignment has been shown to scale linearly with n.

A significant challenge with existing interference alignment schemes is that they require perfect global channel knowledge about all channels in the network, which in turn imposes significant feedback overhead and coordination between nodes. In addition, existing interference alignment schemes are highly sensitive to channel estimation and quantization error, antenna configuration, and mobility.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
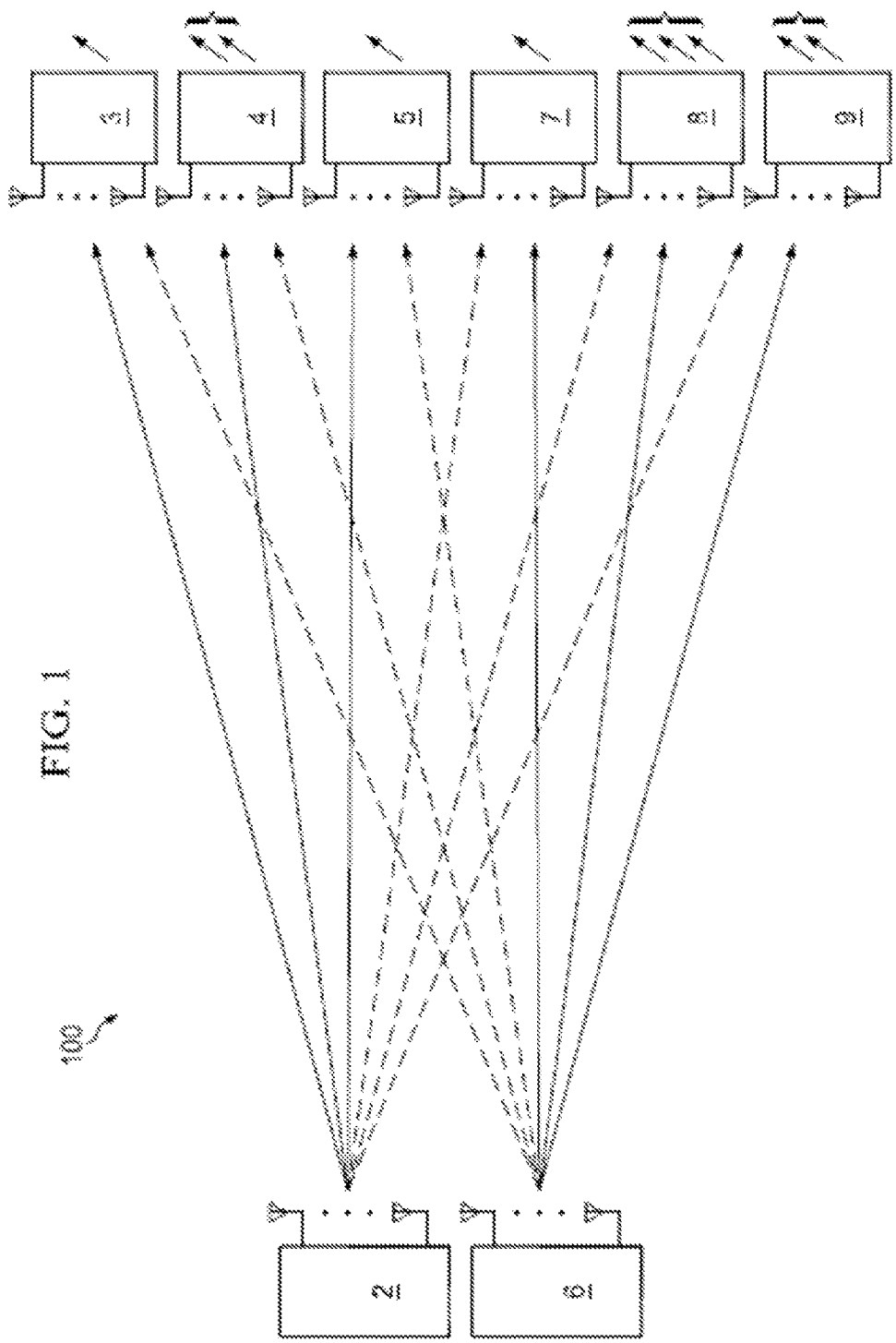
FIG. 1 is a schematic diagram illustrating components of a communication system in which there is downlink multi-user interference alignment between two transmitters and one or more mixed rank receivers.

One of the major challenges in wireless networks is interference. Mobile devices in cellular systems often receive signals from multiple transmitters. Traditional schemes treat interference as noise or try to avoid the interference by orthogonalization of resources like FDMA/TDMA/CDMA between different transmitters (base stations or access points). However, recent results have shown that a technique called "Interference Alignment" (IA) may provide better performance than the schemes based on orthogonalization in some scenarios.

The principle of IA is based on aligning the interference at a receiver coming from different transmitters in the least possible vector subspace dimensions in order to maximize the number of interference-free dimensions, and thus provide more degrees of freedom for signal transmission and improve the throughput performance of transmissions to multiple receivers. One common assumption with respect to existing IA techniques is that the transmitters require perfect global channel state information (CSI) knowledge about all channels. More recently, IA schemes have been proposed in which the two interfering transmitters, while each serving a maximum possible number of UEs simultaneously, only require local CSI knowledge at the nodes. In a further extension of this work, the local CSI knowledge concept was then generalized for the case where users receive data from both transmitters at the same time (i.e., a compound MIMO-X channel).

More specifically, a new IA technique for downlink multi-user system with multiple antennas has been described. In particular, two transmitters were considered, each equipped with M antennas, serving L UEs, each equipped with K antennas, out of a total of N UEs which are associated with $TX_i$, i=1,2, correspondingly. In a first aspect, the focus was on rank-1 transmissions to each UE where each transmitter only needs to know the CSI for its serving UEs, and each UE only needs to know its corresponding channels to the transmitters. In another aspect, this concept was extended to the case of mixed rank transmission to different users. In still another aspect, the concept was generalized to the case of a compound MIMO-X channel in which some UEs are receiving transmissions from both transmitters.

Each of these IA schemes is based on zero-forcing precoding and feeding back full equivalent channel information. Therefore, they require a large amount of feedback, which may result in higher transmit power and noise enhancement in some cases. Accordingly, disclosed herein are embodiments of methods, systems and devices for implementing codebook based IA that include options and algorithms on how to map different data to codewords, how to choose the codebooks, and how to model the error vectors, among other aspects. In the present disclosure, in one embodiment, instead of sending the full channel information, some directional information (by a PMI which presents a vector or matrix closest to the direction of the equivalent channel vector/matrix) and amplitude information (some scalar values) are sent back to the transmitters. The signal is transmitted in the null space of some vectors known for each transmitter and receiver collaborated in IA as before. However, this vector could be predefined as one of the precoding matrix index (PMI) indicated vectors. By feeding back the equivalent channels, the transmission scheme for each cell can be treated as an extended MU-MIMO scheme with which the transmitted signal is in the null-space of some fixed vector.

Various illustrative embodiments will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with communication system limits or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present disclosure.

Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the terms mobile wireless communication device and user equipment (UE) are used interchangeably to refer to wireless devices such as pagers, cellular phones, cellular smart-phones, wireless organizers, personal digital assistants, wireless Internet appliances, data communication devices, data messaging devices, computers, handheld or laptop computers, handheld wireless communication devices, wirelessly enabled notebook computers, mobile telephones, set-top boxes, network nodes, and similar devices that have wireless telecommunications capabilities. In wireless telecommunications systems, transmission equipment in a base station or access point transmits signals throughout a geographical region known as a cell. As technology has evolved, more advanced equipment has been introduced that can provide services that were not possible previously, including but not limited to enhanced node B (eNB) devices rather than a base station or other systems and devices that are more highly evolved than the equivalent equipment in a traditional wireless telecommunications system.

Examples of such advanced or next generation equipment include, but are not limited to, LTE equipment or LTE-Advanced (LTE-A) equipment, and a packet-based network that uses such equipment can be referred to as an evolved packet system (EPS). As used herein, the terms access device or access point refer interchangeably to any component that can provide a UE with access to other components in a telecommunications system, including but not limited to a traditional base station or an LTE or LTE-A access device. An access point provides radio access to one or more UEs using a packet scheduler to dynamically schedule downlink traffic data packet transmissions and allocate uplink traffic data packet transmission resources among all the UEs communicating to the access device. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

Referring now to FIG. 1, there is shown a schematic diagram depiction of a communication system 100 in which there is downlink multi-user interference alignment implemented for signal transmissions from transmitters 2, 6 to receivers 3-5, 7-9 in accordance with exemplary embodiments of the present invention. In the example depicted, each of the transmitters $TX_1$ and $TX_2$ (e.g., eNBs) is equipped with M antennas and configured to transmit signals to receivers (e.g., UEs) which are each equipped with K antennas and configured to receive mixed rank signals. As will be appreciated, multiple dimensions can be generated by using subcarriers (in an OFDM system), antennas, or both, such that M=(# of subcarriers and/or # of time slots)×(# of Actual transmit antennas) and K=(# of subcarriers and/or # of time slots)×(# of Actual receive antennas). The area covered by transmitter $TX_i$ is referred to as cell i and the jth UE in cell i is referred to as UE (i,j) where there are as many as $L_i$ UEs (out of a total of $N_i$ UEs) may be served by the transmitter $TX_i$. Each transmitter $TX_i$, 2, 6 denotes a data transmission device such as a fixed base station, a mobile base station, Macro eNB, Relay Node, Micro eNB, a miniature or femto base station, a relay station, and the like. Each of the receiver nodes 3-5, 7-9 denotes a data reception device such as a relay station, a fixed terminal, a mobile terminal, user equipment and the like. In addition, the $j^{th}$ receiver node or UE ($j=1, \ldots, L_i$) in the $i^{th}$ cell is configured to receive a rank $d_j^i$ transmission, thereby enabling mixed rank signaling. In the illustrated example, $UE_{1,1}$, $UE_{1,L1}$, and $UE_{2,1}$, receive rank-one transmissions, while $UE_{1,j}$ and $UE_{2,L2}$ receive rank-two transmissions, and $UE_{2,j}$, receives rank-three transmissions. To characterize the mixed rank signaling, the maximum rank in each cell is denoted by $d_{max}^i = \max_{j=1, \ldots, L_i} d_j^i$ and the total number of transmission rank for transmitter $TX_i$ is denoted by $D^i = \Sigma_{j=1}^{L_i} d_j^i \leq \min(M, K)$.

Depending on the transmission scheme used by the transmitter $TX_i$ and the location of the UEs, interference may occur at one or more of the receiver nodes 3-5, 7-9. For example, at the first receiver node 3 (denoted $UE_{1,1}$) in the first cell, a signal from the first transmitter $TX_1$ corresponds to a desired signal but a co-channel signal from the second transmitter $TX_2$ may cause interference if the second transmitter uses the same time slot and frequency band as the first transmitter. At the first receiver node $UE_{1,1}$, the desired signal from the first transmitter $TX_1$ arrives over direct channel $H_{1,1}$, while the interfering signal from the second transmitter $TX_2$ arrives over cross channel $G_{1,1}$. Similarly, interference may occur in the other receiver nodes 4-5, 7-9 that decreases signal throughput of the network 100. To overcome the interference between transmitters $TX_1$ and $TX_2$ and allow for mixed rank signaling to different receivers, an interference alignment scheme is proposed for downlink MIMO transmission where each transmitter only needs to know the channel state information (CSI) for its affiliated UEs, and each UE only needs to know the channel between itself and each transmitter. In selected embodiments, the proposed interference alignment scheme uses a plurality of linearly independent vectors $\mathcal{V}_{ref} = \{v_{ref}^1, \ldots, v_{ref}^M\}$ to construct a one or more combining vectors at each of the UEs 3-5, 7-9, depending on the rank of the UE. Using the combining vectors, each UE ($j=1, \ldots, L_i$) projects all cross channels from an interfering transmitter to a predetermined sub-space span $\{(v_{ref}^l)^H\}$ for $l=1, \ldots, d_j^i$, thereby eliminating inter-cell interference if each transmitter sends its signal in the null space of the predetermined vectors $(v_{reg}^l)$ for $l=1, \ldots, d_j^i$. For example, each rank-one UE computes a combining vector from the first vector $v_{ref}^1$ and the inverse of the cross channel, while a rank-two UE computes two combining vectors from the first two vectors, $v_{ref}^1$ and $v_{ref}^2$ and the inverse of the cross channel, and so on. In addition, each transmitter uses channel quality information (CQI) and equivalent direct channel matrix information $H_{i,j}^{eq}$ for selected UEs to perform link adaptation and to precode data with a precoding matrix $V_i$ to cancel out both the intra-cell and inter-cell interference. In this way, interference alignment is performed at the UEs by using the combining vector to convert the cross channel to the predetermined sub-spaces.

In the following, two cases are considered where (i) the numbers of antennas on the user equipment is greater than (or equal to) the number of antennas on the BS (e.g., $K \geq M$) and (ii) the numbers of antennas on the BS is greater than the number of antennas on the UE (e.g. $K < M$).

Interference Alignment for Case $K \geq M$

It is assumed that $L_i$ users are selected in the $i^{th}$ cell ($i=1,2$) such that in each cell $D^i + d_{max}^{3-i} \leq M$. The channel from the $i^{th}$ transmitter, $i=1, 2$, to the $j^{th}$ UE in the same cell is denoted by $K \times M$ dimensional matrix $H_{i,j}$ and to the $j^{th}$ UE in cell $3-i$ by $K \times M$ dimensional matrix $G_{i,j}$. The received signal at the $j^{th}$ UE of cell $i$ ($i=1,2$) can be written as $$y_{i,j} = H_{i,j} x_i + G_{3-i,j} x_{3-i} + n_{i,j}, \quad (1)$$

where $x_i$ denotes the transmitted signal from the $i^{th}$ transmitter, $i=1, 2$, and $n_{i,j}$ is the noise at the $j^{th}$ UE.

Each UE $j$ can determine, measure, or estimate the direct channel $H_{i,j}$ to the serving transmitter and determine the rank of the channel, $d_j^i$ using well known techniques. This rank determines that UE can receive a signal up to rank $d_j^i$ from transmitter i. Each UE can report back $d_j^i$ as rank indicator (RI) information and multiple CQI for each one of $d_j^i$ data streams. As part of a scheduling operation, a transmitter can select different UEs with rank $d_j^i$. Transmitter i can also assign $d_j^i$ to UE j. It could assign this value considering other UEs in the cell and UE's transmission status.

It is assumed that there are known codebooks $\mathcal{S}_r = \{V_r^1, \ldots, V_r^{M_r}\}$ (where $\mathcal{S}_r$ has $M_r$ codewords), for $r=1, \ldots, M$, in which $V_r^p$ ($p=1, \ldots, M_r$) is a $M \times r$ dimensional matrix. It is also assumed that the codebooks $\mathcal{S}_r$ are predefined and known to all UEs and both transmitters. In one embodiment, these codebooks may be the same as precoding codebooks in 3GPP ($3^{rd}$ Generation Partnership Project) Release 8 or 10.

Each UE $j$ in cell i, requesting a signal of rank $d_j^i$, will select the codebook $\mathcal{S}_r$, with $r=d_j^i$. Then, the UE will select one of the matrices in this codebook, based on some criteria. It is also assumed that for each value of r the selected matrix in the codebook is always fixed and known to all UEs and transmitters. The selected matrix from the codebook $\mathcal{S}_r$ is denoted by $V_{ref}^{i,j}$. For simplicity and ease of notation, here, $V_{ref}^{i,j}$ is defined as the concatenation of the first $d_j^i$ vectors in the predefined set $\mathcal{V}_{ref} = \{v_{ref}^1, \ldots, v_{ref}^M\}$, where $v_{ref}^l$ is an M dimensional vector.

Each UE can also estimate the interfering channel $G_{3-i,j}$, the channel between UE and the interfering transmitter. Since $K \geq M$, all channels $G_{3-i,j}$ are invertible with probability almost one in a multipath rich wireless propagation environment. The pseudo inverse of $G_{3-i,j}$ is denoted by $G_{3-i,j}^+ = (G_{3-i,j}^H G_{3-i,j})^{-1} G_{3-i,j}^H$. At the $i^{th}$ cell (i=1,2), the $j^{th}$ UE ($j=1, \ldots, L_i$) multiplies the received signal by $(V_{ref}^{i,j})^H G_{3-i,j}^+$ to reveal:

$$\tilde{y}_{i,j} = (V_{ref}^{i,j})^H G_{3-i,j}^+ y_{i,j} = H_{i,j}^{eq} x_i + (V_{ref}^{i,j})^H x_{3-i} + n_{i,j}^{eq}, i=1, 2 j=1, \ldots, L_i \quad (2)$$

where $H_{i,j}^{eq} = (V_{ref}^{i,j})^H G_{3-i,j}^+ H_{i,j}$ is $d_j^i \times M$ matrix of equivalent channel and $n_{i,j}^{eq} = (V_{ref}^{i,j})^H G_{3-i,j}^+ n_{i,j}$. $\tilde{y}_{i,j}$ and $n_{i,j}^{e,q}$ are vectors of dimension $d_j^i$, with elements $\tilde{y}_{i,j}^l$ and $n_{i,j}^{l,eq}$ for $l=1, \ldots, d_j^i$.

Considering Equation (2) for all $i=1,2$; $j=1, \ldots, L_i$; $l=1, \ldots, d_j^i$, in order to cancel the inter-cell interference, the transmitted signal $x_{3-1}$ (for i=1,2) should be designed such that it is in the null space of $V_{ref}^{i,j}$ for $j=1, \ldots, L_i$. Satisfying this constraint in design of the signal $x_i$, in the $i^{th}$ cell (i=1,2), for the $j^{th}$ UE ($j=1, \ldots, L_i$) the received signal appears as:

$$\tilde{y}_{i,j} = H_{i,j}^{eq} x_i + n_{i,j}^{eq}, \quad (3)$$

This means that all interference from the $(3-i)^{th}$ transmitter to the $j^{th}$ UE in the other cell ($i^{th}$ cell) is aligned such that each UE in the $i^{th}$ cell can decode a signal of rank $d_j^i$. On the other hand, the $i^{th}$ transmitter should provide total $D^i$ degrees of freedom for its own users. Also, its signal should be in the null space of $V_{ref}^{i,j}$ for $j=1, \ldots, L_i$, i.e., its signal should be in the null space of the subspace containing $d_{max}^{3-i}$ vectors in the set $\mathcal{V}_{ref}$. This requires that the $i^{th}$ transmitter should have at least $D^i + d_{max}^{3-i}$ antennas.

With this scheme, in each cell the problem is reduced to downlink multi user, multiple input multiple output (DL MU-MIMO) with the equivalent channel:

$$H_{i,j}^{eq} = (V_{ref}^{i,j})^H G_{3-i,j}^{30} H_{i,j} \quad (4)$$

for the $j^{th}$ UE ($j=1,\ldots,L_i$) with $d_{max}^{3-i}$ dimensions reserved for interference from the other cell. Each UE in the cell is required to feed back the $d_j^i \times M$ equivalent channel matrix $H_{i,j}^{eq}$.

It is assumed that there are known codebooks $\mathcal{P}_r = \{P_r^1, \ldots, P_r^{M_r}\}$, for $r=1,\ldots,M$, in which $P_r^p$ ($p=1,\ldots,M_r$) is a $r \times M$ dimensional matrix. It is also assumed that the codebooks $\mathcal{P}_r$ are predefined and known to all UEs and both transmitters. In one embodiment these codebooks can be the same as precoding codebooks in 3GPP Release 8 or 10. Each UE feeds back the PMI as the index of the matrix $P_r^{i,j}$ in the set $\mathcal{P}_r$. All the methods for finding the precoding matrix in Release 8 or 10 may be used. For example, in a release 8 PMI-based approach, $P_r^{i,j}$ can be selected as the codeword in $\mathcal{P}_r$ such that it is closest to the right eigenvectors of $H_{i,j}^{eq}$, i.e., when writing $H_{i,j}^{eq}$ as $U_{i,j}\Lambda_{i,j}W_{i,j}^H$ (SVD decomposition of $H_{i,j}^{eq}$), it will be closest to $W_{i,j}$. In another embodiment, $P_r^{i,j}$ can be chosen to minimize the chordal distance between the subspace spanned by $H_{i,j}^{eq}$.

According to PMI, CQI and RI (equivalently $d_j^i$) for different users, the $i^{th}$ transmitter can schedule $L_i$ users such that the number of transmit antennas is not less than the sum of data streams provided to the users in the $i^{th}$ cell and the reserved data ranks for interference, i.e., $M \geq D^i + d_{max}^{3-i}$, where $D^i$ is the degrees of freedom that the $i^{th}$ transmitter provides for its users. It will be noted that in this case, each transmitter should know the maximum rank that the other transmitter is providing to its users (i.e., $d_{max}^{3-i}$). This information can be exchanged between transmitters or there can be a predefined setting that transmitters follow. In one embodiment, they can agree on a predefined value, i.e., $d_{max}^1 = 32$ $d_{max}^2 =$ known $d_{max}$.

It is favorable that this scheme is implemented for the case that all UEs in each cell request a fixed rank, i.e., $d_j^i = d^i$ for $j=1,\ldots,L_i$. For example, the first transmitter schedules those users that all request a rank-1 data stream and the second transmitter schedules those users that all request a rank-2 data stream. In this way, if all UEs in a cell request rank-1 data streams except one which requests a rank-2 data stream, the other transmitter should reserve two dimensions for a rank-2 interference. This can be considered as a waste of resources which can be addressed during UE scheduling.

Any techniques used in DL MU-MIMO, such as zero-forcing or dirty paper coding (DPC), may be used. As an example, assuming zero-forcing precoding, the $i^{th}$ transmitter should use the first $D^i$ vectors in the inverse of the matrix of dimension $(D^i + d_{max}^{3-i}) \times M$ $$P_i \begin{bmatrix} p_{d_1^i}^{i,1} \\ \vdots \\ p_{d_{L_i}^i}^{i,L_i} \\ v_{ref}^{1\;T} \\ \vdots \\ v_{ref}^{d_{max}^{3-i}\;T} \end{bmatrix} \quad (5)$$

as the precoding matrix $V_i$ for constructing the transmitted signal $x_i$ (for $i=1,2$). In this example, the vectors in precoding matrix $V_i$ may be normalized so that each stream has the same transmit power. As a result, the constructed transmit signal is:

$$x_i = V_i s_i \quad (6)$$

In Equation (6), $V_i = [v_{i,1} \ldots v_{i,L_i}]$ is the first $D^i$ columns of the matrix $P_i^+ = P_i^H(P_i P_i^H)^{-1}$, where $v_{i,j}$ is the precoding matrix of size $M \times d_j^i$ for the $j^{th}$ user and the $l^{th}$ column ($l=1,\ldots,d_j^i$) of this matrix is denoted by $v_{i,j}^l$. In addition, $s_i = [s_{i,1} \ldots s_{i,L_i}]$ represents data symbols to be transmitted at the $i^{th}$ transmitter and $s_{i,j}$ is a vector of size $d_j^i \times 1$ representing a rank-$d_j^i$ signal that should be transmitted to user j. With this precoding scheme, inter-cell and intra-cell interference are cancelled and the $j^{th}$ UE ($j=1,\ldots,L_i$) in the $i^{th}$ cell ($i=1,2$) can decode its $l^{th}$ data stream ($l=1,\ldots,d_j^i$) using single-user detection algorithms using:

$$\tilde{y}_{i,j} = H_{i,j}^{eq} v_{i,j} s_{i,j} + \Sigma_{k \neq j} H_{i,j}^{eq} v_{i,k} s_{i,k} + n_{i,j}^{eq}, \quad (7)$$

where $s_{i,j} = [s_{i,j}^l]$ and $s_{i,j}^l$ denotes the $l^{th}$ data stream sent to the UE $(i,j)$, $H_{i,j}^{eq} v_{i,j}$ can be considered as the equivalent channel for the data streams of $j^{th}$ user from the $i^{th}$ transmitter. The first term in the above summation represents the desired signal, the second term represents the intra-cell interference due to the imperfect feedback, and the third term represents noise. Each UE can calculate the required equivalent channels using reference signals, for example like 3GPP Release 8 LTE.

The interference alignment schemes disclosed herein may be considered as an improved MU-MIMO technique. Therefore, any improvements and resources that exist for MU-MIMO in 3GPP release 10 may be used here, e.g., companion PMI, etc. Also, in the $i^{th}$ cell ($i=1,2$), RI (equivalently $d_j^i$) may be estimated and reported back to the transmitter by UE $j=1,\ldots,L_i$ and according to RI there may be multiple CQIs for each one of the RI data streams based on the effective received SNR. Notably, for each UE, RI is either fed back to the transmitter or the transmitter can decide on the RI. Transmitters can also use this information for scheduling, pairing, and link adaptation.

As should further be noted, to achieve this IA the transmitters need only have the knowledge of the equivalent channels of their affiliated users (in order to construct $P_i$ and $V_i$) and they do not need to know their corresponding cross channels to the users in the other cell. In other words, only local CSI is needed at each node. Also, as mentioned before, the $i^{th}$ transmitter will schedule $L_i$ users such that $M \geq D^i + d_{max}^{3-i} 0$ One difference between the present codebook-based scheme and the earlier described schemes based on perfect CSI assumption at the transmitters is the fact that the intra-cell interference (the second term in Equation (7)) is inevitable. This makes the estimate of CQI at the UEs non-precise, as the UEs do not know the precoding vectors of other UEs to be paired with. As the interference term is proportional to the quantization error, one way to estimate the signal to interference plus noise ratio (SINR), which will be mapped to CQI, is by using the following equation:

$$SINR_{i,j} \approx \frac{1}{d_j^i} \left| I + \frac{SNR}{L_i} H_{i,j}^{eq} P_{d_j^i}^{i,j} P_{d_j^i}^{i,j\,H} H_{i,j}^{eq\,H} \left( Cov(n_{i,j}^{eq}) + \frac{SNR}{L_i} H_{i,j}^{eq} \Psi_{d_j^i}^{i,j} \Psi_{d_j^i}^{i,j\,H} H_{i,j}^{eq\,H} \right)^{-1} \right| - 1 \quad (8)$$

where $$\Psi_{d_j^i}^{i,j}$$

denotes the null space of $$P_{d_j^i}^{i,j}.$$

The above equation gives the average SINR per data stream.

Figure 2:
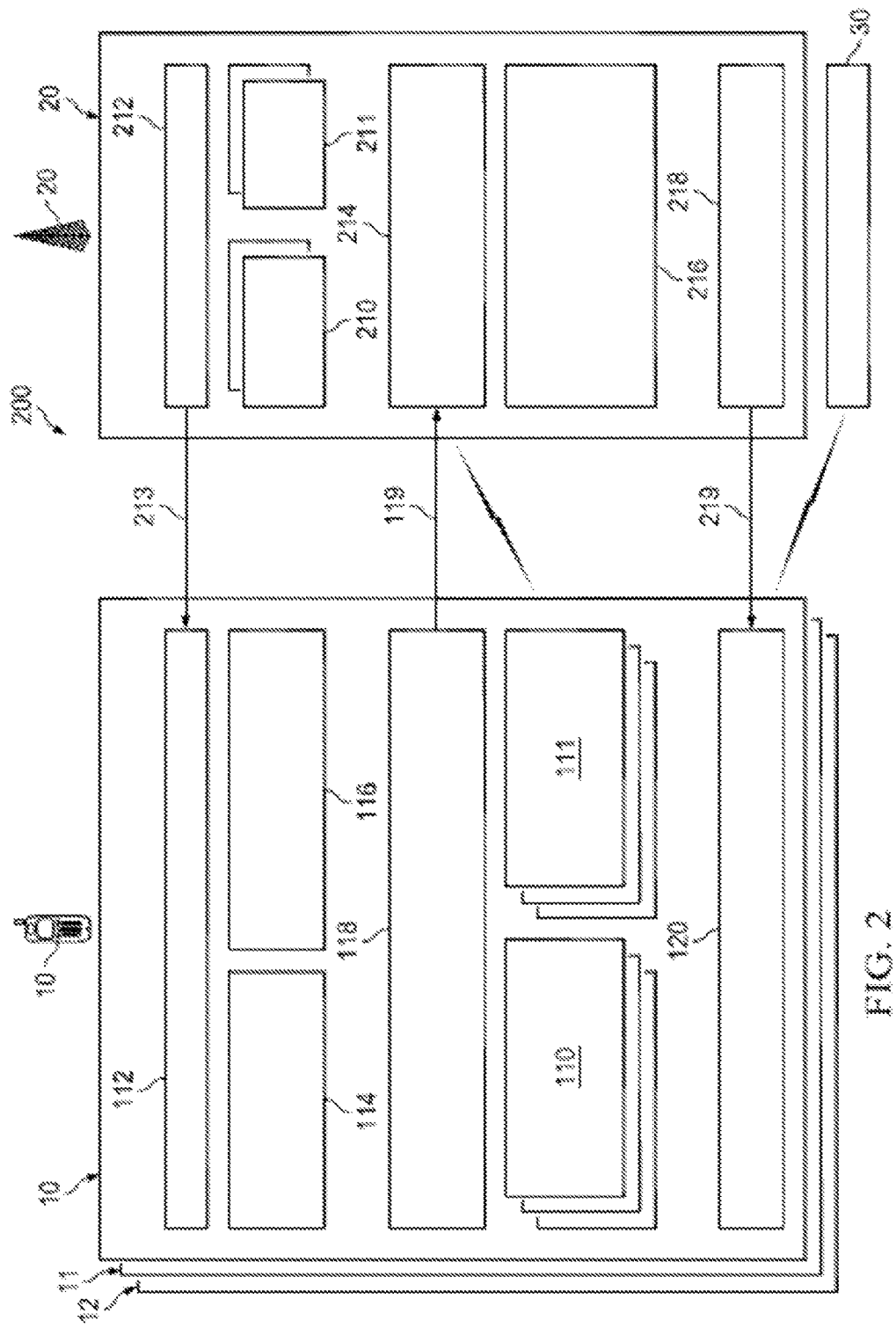
FIG. 2 is a schematic diagram illustrating components of a communication system which provides interference alignment between two interfering transmitters which may each send mixed rank transmissions to the maximum possible number of receivers simultaneously while only requiring local channel state knowledge at the transmitters such that all crossed channels are aligned to a predetermined reference vector.

To understand how a plurality of linearly independent reference vectors $(v_{ref}^l)^H$ may be used to align interference in the network 100, reference is now made to FIG. 2 which schematically depicts a communication system 200. The communication system 200 provides interference alignment between two interfering access devices 20, 30 and one or more mixed rank user equipment (UE) devices 10-12 requiring only local channel state knowledge at the access devices 20, 30 such that all crossed channels are aligned to the predetermined reference sub-spaces. To this end, each of the UEs 10-12 is configured to compute equivalent direct channel matrix information $H_{i,j}^{eq}$ from a plurality of linearly independent reference vectors $(v_{ref}^l)^H$ according to equation (4). In order to feed back the equivalent direct channel matrix information $H_{i,j}^{eq}$ to the affiliated access device (e.g., 20), each UE 10-12 feeds back a PMI as the index of the matrix $P_r^{i,j}$ in the set $\mathcal{P}_r$. Then, the access device 20 constructs a transmission signal x by precoding the transmit data according to equation (5) and in the null space of $(v_{ref}^l)^H$ where l=1, . . . , $d_{max}$ and $d_{max}$ represents the maximum rank that the other access device 30 is providing to its users so that minimal interference is imposed to the UEs in the other cell. For purposes of transforming the transmit data and signals as described herein, the UE 10 includes, among other components, one or more processors 110 that run one or more software programs or modules embodied in circuitry and/or non-transitory storage media device(s) 111 (e.g., RAM, ROM, flash memory, etc.) to communicate with access device 20 to receive data from, and to provide data to, access device 20. When data is transmitted from UE 10 to access device 20, the data is referred to as uplink data and when data is transmitted from access device 20 to UE 10, the data is referred to as downlink data.

As part of the MIMO downlink process, the UE 10 determines, quantifies or estimates the channel matrices H and G which respectively represent the channel gain between the first access device 20 and second access device 30 and the UE. For example, the channel matrix H can be represented by a K×M matrix of complex coefficients, where M is the number of transmit antennas in the first access device 20 and K is the number of receive antennas in the UE 10. Alternatively, the channel matrix H can instead be represented by an M×K matrix of complex coefficients, in which case the matrix manipulation algorithms are adjusted accordingly. The coefficients of the channel matrix H depend, at least in part, on the transmission characteristics of the medium, such as air, through which a signal is transmitted. A variety of methods may be used at the receiver to determine the channel matrix H and G coefficients, such as transmitting a known pilot signal to a receiver so that the receiver, knowing the pilot signal, can estimate the coefficients of the channel matrix H and G using well-known pilot estimation techniques. Alternatively, when the channel between the transmitter and receiver are reciprocal in both directions, the actual channel matrix H is known to the receiver and may also be known to the transmitter. To this end, each access device (e.g., 20) may include a pilot signal generator (e.g., 212) for generating and transmitting a pilot signal 213. In addition, each UE 10 may include a channel estimation module 112 using hardware and/or software executed by one or more processor elements to determine or estimate the channel matrices H and G from the access devices 20, 30.

At the UE 10, a combining vector computation module 114 is provided for computing or retrieving a combining vector $r_{i,j}^l$. In the cases where the UE antenna count K is at least equal to the access device antenna count M, the estimated channel matrices H and G may be used to compute the combining vector by first computing the pseudo inverse of the interfering cross channel $G^+$. Next, an arbitrary set of linearly independent reference vectors $\mathcal{V}_{ref} = \{v_{ref}^1, \ldots, v_{ref}^M\}$, each of size M, is defined or obtained, where the reference vector set $\mathcal{V}_{ref}$ is known to all UEs and transmitters because it was signaled or pre-determined. In one embodiment, $\mathcal{V}\mathcal{V}_{ref}$ consists of orthogonal reference vectors. Assuming a signal of rank-d should be received by UE 10, after determining the Hermitian transpose of d reference vectors from the reference vector set, $(\mathcal{V}_{ref}^l)^H$ for l=1, . . . , d, the computation module 114 then computes the combining vector $r^l = (v_{ref}^l)^H G^+$.

The UE 10 also includes an equivalent channel matrix computation module 116 which computes equivalent direct channel matrix information $H_{i,j}^{eq}$ from a plurality of linearly independent reference vectors $(v_{ref}^l)^H$ according to equation (4). The UE 10 may feed back an estimate/notion of equivalent channel matrix $H_{i,j}^{eq}$ to the access point 20 by feeding back a PMI as the index of the matrix $P_r^{i,j}$ in the set $\mathcal{P}_r$. The access point 20 also receives equivalent channel matrix information from the other affiliated UEs 11, 12 in the cell for access point 20. In selected embodiments, the feedback module 118 sends a PMI as an uplink message 119. Alternatively, when TDD mode is used, the access point 20 can estimate the equivalent channel matrix $H_{i,j}^{eq}$ from the uplink channel. The feedback module 118 may also send RI and multiple CQI information, such as an indication of effective noise power, to the access point 20 for use in scheduling and link adaptation.

At the access device 20, PMI and RI/CQI information is processed and transformed by one or more processors 210 that run one or more software programs embodied in non-transitory storage media device(s) 211 (e.g., RAM, ROM, flash memory, etc.). For example, after receiving the PMI and any RI or CQI information from all affiliated UEs 10-12, the access point 20 processes the feedback information to avoid any co-channel interference to non-affiliated UEs. To this end, a selection module 214 at the access point 20 uses the acquired estimated equivalent channel matrices and any RI or CQI information to select a subset of $L_i$ UEs out of a total of $N_i$ UEs. The selected $L_i$ UEs are indexed by $(s_1, \ldots, s_{L_i})$. In addition, the access device 20 includes a precoding module 216 which uses the equivalent channel matrices to construct or precode a transmit signal $x_i = V_i s_i$, where $V_i$ denotes the precoding matrix for the $i^{th}$ transmitter or access device and $s_i$ represents data symbols to be transmitted at the $i^{th}$ transmitter or access device. In particular, the precoding module 216 may compute the precoding matrix $V_i$ by computing matrix $P_i$, computing the inverse matrix $P^+$, and then selecting the first $D^i$ columns of the matrix $P^+$, where $D^i$ is the total number of transmission rank $(D^i = \Sigma_{j=1}^{L_i} d_j^i \leq \min(M, K))$. Assuming zero-forcing precoding, the access device 20 may be configured as the ith transmitter to compute matrix P of dimension $(D^i + d_{max}^{3-i}) \times M$, as $$P_i \begin{bmatrix} P_{d_1^i}^{i,1} \\ \vdots \\ P_{d_{L_i}^i}^{i,L_i} \\ v_{ref}^{1\,T} \\ \vdots \\ v_{ref}^{d_{max}^{3-i}\,T} \end{bmatrix},$$

followed by computation of the inverse matrix $P_i^+ = P_i^H (P_i P_i^H)^{-1}$, followed by the selection of the first $D^i$ columns of matrix $P_i^+$ to form the precoding matrix $V_i = [v_{i,1} \ldots v_{i,L_i}]$, where $v_{i,1}$ is the precoding matrix of size $M \times d_j^i$ for the $j^{th}$ user with the $l^{th}$ column ($l=1, \ldots, d_j^i$) of this matrix denoted by $v_{i,j}^l$. Though not shown, there may also be scheduling and link adaptation performed on the data symbols $s_i$ at the precoding module 216 or transmit module 218. As the precoded data $x_i$ is transmitted over a downlink message 219 to the UE 10, it is received at the decode module 120 where it appears as the received signal $\tilde{y}_{i,j} = H_{i,j}^{eq} v_{i,j} s_{i,j} + \Sigma_{k \neq j} H_{i,j}^{eq} v_{i,k} s_{i,k} + n_{i,j}^{eq}$ in which the inter-cell and intra-cell interference are cancelled. As a result, the UE 20 can decode data from the received signal $\tilde{y}_{i,j}^{eq}$ using single user detection algorithms.

Figure 3:
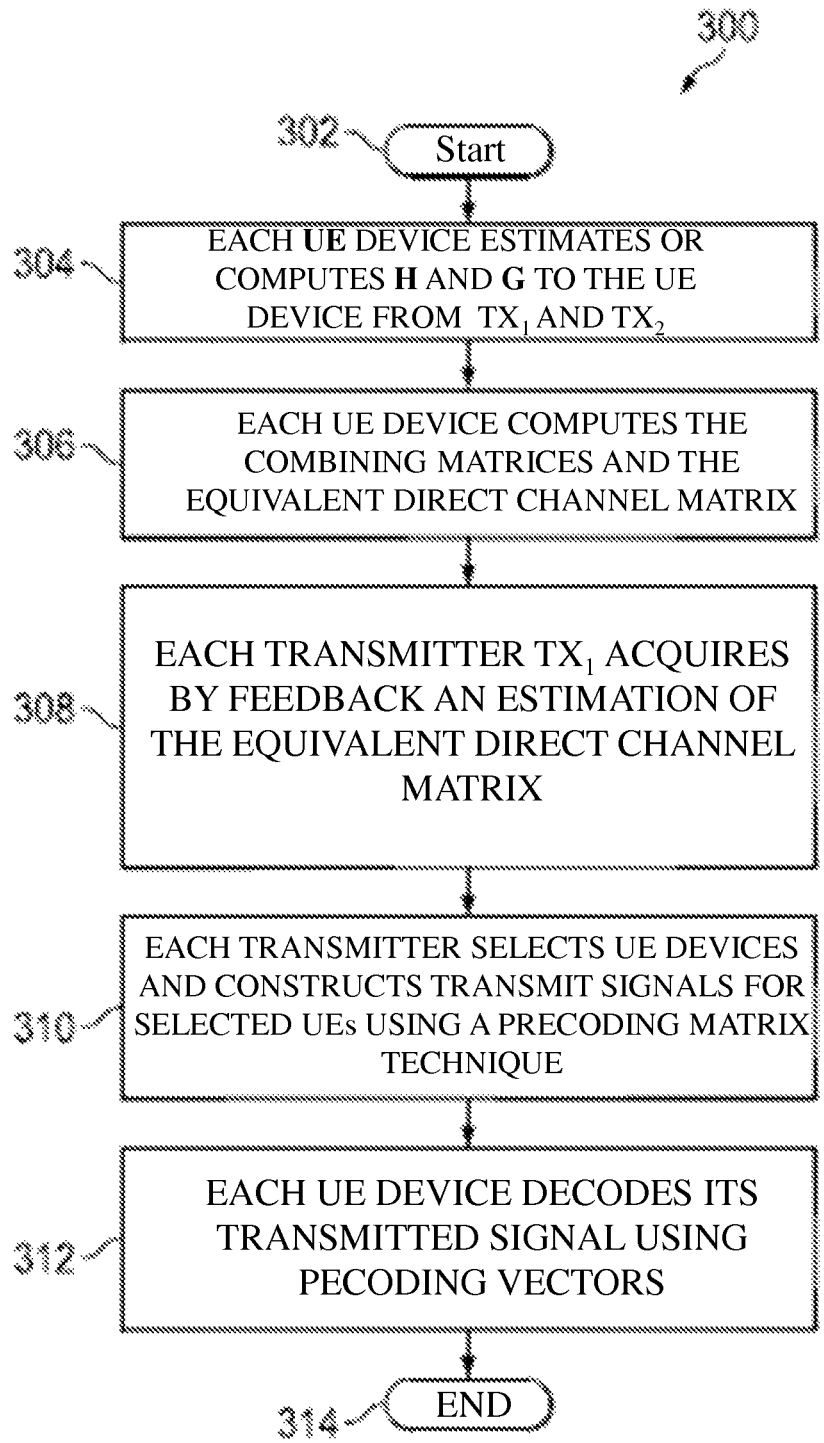
FIG. 3 is a flow chart illustrating an interference alignment process that may be performed when the number of receiver antennas equals or exceeds the number of transmitter antennas.

Referring now to FIG. 3, there is depicted in flow chart form an interference alignment process 300 that may be performed when the number of receiver antennas K equals or exceeds the number of transmitter antennas M. Once the procedure starts (block 302), each $UE_{i,j}$ device estimates or computes at (block 304) the direct channel $H_{i,j}$ and cross channel $G_{i,j}$ to the $UE_{i,j}$ device from potentially interfering transmitters $TX_1$ and $TX_2$. Channel information may be computed using pilot estimation techniques.

At block 306, each $UE_{i,j}$ device computes the combining matrices $V_{ref}^{i,j})^H G_{3-i,j}^+$ based on the cross channel $G_{i,j}$, such as by multiplying the Hermitian reflection of the shared reference vectors $v_{ref}^l$ (for $l=1, \ldots, d_j^i$) and the pseudo inverse of the cross channel $G_{i,j}^+$. In addition, each $UE_{i,j}$ device computes the equivalent direct channel matrix information $H_{i,j}^{eq}$ based on the estimated direct channel $H_{i,j}$ and computes the corresponding PMI as a notion of the equivalent channel which is sent to the transmitter.

At block 308, each transmitter $TX_i$ acquires (e.g., by feedback) an estimation of the equivalent direct channel matrix information, denoted by PMI, for the affiliated UE devices, along with any channel quality indicator (CQI), either directly or indirectly using codebook or non-codebook techniques.

At block 310, each transmitter $TX_i$ selects $L_i$ UE devices from a total of $N_i$ UE devices in the ith cell, and then constructs transmit signals $x_i$ for the selected UEs. In selected embodiments, the transmit signals $x_i$ are constructed using a precoding matrix technique, such as described in Equations (5) and (6), and/or link adaptation technique (such as described herein), and then transmitted as downlink data to the selected UEs.

At block 312, each $UE_{i,j}$ device decodes its transmitted signal $x_i$ which appears as a receive signal vector signal $\tilde{y}_{i,j} = H_{i,j}^{eq} v_{i,j} s_{i,j} + \Sigma_{k \neq j} H_{i,j}^{eq} v_{i,k} s_{i,k} + n_{i,j}^{eq}$. In order to decode the receive signal vector, each $UE_{i,j}$ device may know or derive its own precoding vectors $v_{i,j}^l$. At block 314, the process ends.

Interference Alignment for Case K<M

In addition to the foregoing, selected embodiments may also implement the disclosed interference alignment schemes in cases where the number of antennas on the eNB is greater than the number of receive antennas on the UE (e.g. K<M), provided that adjustments are made to match or correlate the cross channels $G_{i,j}$ with the predetermined vectors $(v_{ref}^l)^H$. The adjustments are used because the cross channels $G_{i,j}$ are not invertible in the case where the UE antenna count K is less than the access device antenna count M. To address this matching problem, a number of adjustment schemes may be used.

Euclidean Distance Minimization

In a first adjustment scheme, Euclidean Distance Minimization (EDM) techniques may be used to find or compute an EDM combining vector/matrix at the receiver side such that the Euclidean distance between the equivalent interference channels for the $l^{th}$ data stream of each UE and $(v_{ref}^l)$ is minimized Referring again to FIG. 2, the EDM technique may be implemented by the combining vector computation module 114 at each UE to compute the combining matrix as follows:

$$R_{i,j} = \arg\min_R \|RG_{3-i,j} - (V_{ref}^{i,j})^H\|^2 \qquad (9)$$

$$\text{s.t. } \|RG_{3-i,j}\|_F^2 = 1,$$

This gives the combining vector for the $l^{th}$ data stream as follows:

$$R_{i,j} = \frac{(V_{ref}^{i,j})^H G_{3-i,j}^+}{\|(V_{ref}^{i,j})^H G_{3-i,j}^+ G_{3-i,j}\|_F}. \qquad (10)$$

where $G_{3-i,j}^+ = G_{3-i,j}^H (G_{3-i,j} G_{3-i,j}^H)^{-1}$ such that $G_{3-i,j}^+$ is defined such that $G_{3-i,j} G_{3-i,j}^+ = I$.

The equivalent direct channel matrix for each stream is computed as follows:

$$H_{i,j}^{eq} = \frac{(V_{ref}^{i,j})^H G_{3-i,j}^+ H_{i,j}}{\|(V_{ref}^{i,j})^H G_{3-i,j}^+ G_{3-i,j}\|_F}. \qquad (11)$$

The remaining processing at the UE 10 and access point 20 proceeds substantially as described with reference to blocks 308-314 in the interference alignment process 300 depicted in FIG. 3 except the fact that the calculation of CQI will be affected by the amount of inter-cell interference since the inter-cell interference cannot be cancelled completely.

Time/Frequency Extension (TFE)

In a second adjustment scheme for cases where the number of antennas on the eNB is greater than the number of receive antennas on the UE (e.g. K<M), the interfering channels of UEs are extended in time and/or frequency domain such that the aggregate channel becomes invertible. For example, in OFDM systems like LTE or LTE-Advanced systems, the channels can be extended by using time/frequency resource elements. By extending the time/frequency of the interfering co-channels, the scheme described before for the case of K≥M can be used here.

Figure 4:
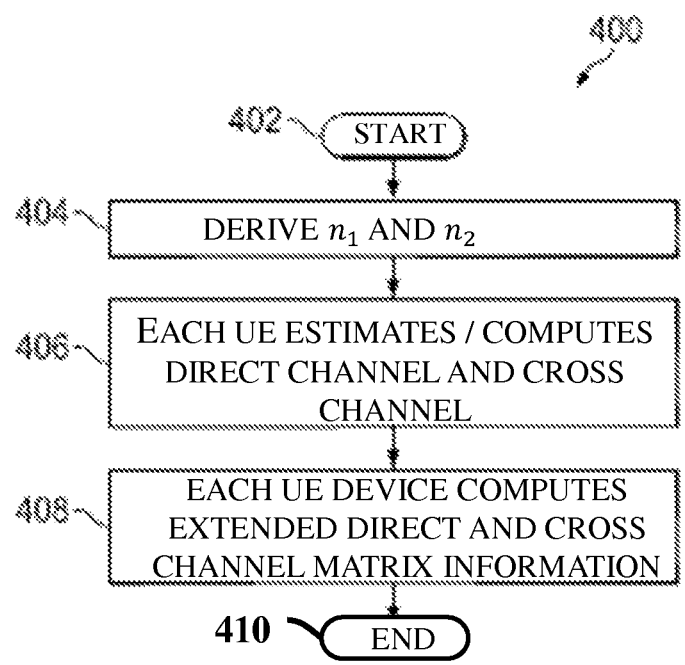
FIG. 4 is a flow chart illustrating an interference alignment process that may be performed to extend the interfering channels in frequency in cases when the number of transmitter antennas exceeds the number of receiver antennas.

To illustrate an example interference alignment process that may be performed to extend the interfering channels in frequency, reference is now made to FIG. 4 which depicts in flow chart form an interference alignment process 400 that may be performed in cases when the number of transmitter antennas M exceeds the number of receiver antennas K. Once the procedure starts (block 402), each $UE_{i,j}$ device effectively extends the interfering channels by finding or deriving $n_1$ and $n_2$ (at block 404) that are the smallest integer numbers such that:

$$n_1 M = n_2 K (n_2 > n_1) \qquad (12)$$

For example, if M=4 and K=2, then $n_1=1$ and $n_2=2$.

In this embodiment, the frequency extension is described. The time extension approach is similar. At block 406, each $UE_{i,j}$ device estimates or computes the direct channel $H_{i,j}$ and cross channel in each of the subcarriers $w_1$ to $w_{n2}$ of the channels between the $UE_{i,j}$ device and potentially interfering transmitters $TX_1$ and $TX_2$. The channel estimation module 112 shown in FIG. 2 may be used here to implement pilot signal estimation or any other desired channel estimation technique.

At block 408, each $UE_{i,j}$ device computes extended direct and cross channel matrix information. The combining vector computation module 114 shown in FIG. 2 may be used to compute the extended direct and cross channel matrix information. To implement frequency extension, the cross channel of the UE (i,j) in the subcarriers $w_1$ to $w_{n_2}$ may be denoted as $\{G_{3-i,j}(w_k)\}_{k=1}^{n_2}$, where it is understood that a subcarrier refers to a frequency unit or band. With this approach, the aggregate cross channel is defined as $$G_{3-i,j} \triangleq [G_{3-i,j}(w_1)^T | \ldots | G_{3-i,j}(w_{n_2})^T]^T. \quad (13)$$

where $[.]^T$ denotes the transpose operation. From the foregoing, the size of $G_{3-i,j}$ is therefore $(Kn_2) \times M = (Mn_1) \times M$. Now, represent $G_{3-i,j}$ is represented as follows:

$$G_{3-i,j} = [F_{3-i,j}(t_1)^T | \ldots | F_{3-i,j}(t_{n_1})^T]^T, \quad (14)$$

in which $\{F_{3-i,j}(t_k)\}_{k=1}^{n_1}$ are all square M×M matrices that are invertible with probability almost equal to one in a multipath rich frequency selective channel with tone separations larger than the coherence channel bandwidth. Similarly, the aggregate matrix of direct channels $$H_{i,j} \triangleq [H_{i,j}(w_1)^T | \ldots | H_{i,j}(w_{n_2})^T]^T$$

may be represented as:

$$H_{i,j} = [K_{i,j}(t_1)^T | \ldots | K_{i,j}(t_{n_1})^T]^T \quad (15)$$

With this transformation, the transmitted and received signals and noise vectors in the subcarriers $w_1, \ldots, w_{n_2}$ can be transformed to $$x_i \triangleq [x_i(w_1)^T | \ldots | x_i(w_{n_2})^T]^T = [q_i(t_1)^T | \ldots | q_i(t_{n_1})^T]^T, \quad (16)$$

$$y_{i,j} \triangleq [y_{i,j}(w_1)^T | \ldots | y_{i,j}(w_{n_2})^T]^T = [z_{i,j}(t_1)^T | \ldots | z_{i,j}(t_{n_1})^T]^T, \quad (17)$$

$$n_{i,j} \triangleq [n_{i,j}(w_1)^T | \ldots | n_{i,j}(w_{n_2})^T]^T = [w_{i,j}(t_1)^T | \ldots | w_{i,j}(t_{n_1})^T]^T. \quad (18)$$

To conclude block 408, each $UE_{i,j}$ device computes the interference channel matrix $F_{3-i,j}(t_k)$ (from Equation (14)) and direct channel matrix $K_{i,j}(t_k)$ (from Equation (14)). At block 410, the process ends. Now, the scheme described before for the case of K≥M can be used here.

While the description provided explains how the direct and interfering channels as well as the corresponding transmit and receive signals of UEs are extended in the frequency domain, it will be appreciated that a similar approach would be used to extend the interfering channels in the time domain. In either case of time or frequency extension, it will be appreciated that there is implied a loss in the spectral efficiency by the ratio of $$\frac{D^i n_1}{n_2}$$

compared to the M=K case due to the fact that n1 independent mixed-rank signals are transmitted over n2 subcarriers. As a consequence, the extension scheme may not be suitable for small values of $$\frac{D^i n_1}{n_2}.$$

In addition, it will be appreciated that the frequency extension approach has more potential for practical use since the time extension approach implies decoding delay which is not acceptable for many applications.

In selected embodiments, the throughput performance in the case of frequency extension can be improved by selecting a proper set of subcarriers to implement the frequency extension algorithm. For this purpose, it is important to have the matrices $$\{K_{i,j}(t_k)\}_{k=1}^{n_1}$$

as far away as possible from the singularity. One way to satisfy this would be to make the chordal distance between the subspaces spanned by $$\{G_{i,j}(w_k)\}_{k=1}^{n_2}$$

above a certain (configurable) threshold. To this end, all UE devices that are going to be served in the "interference alignment" mode may be configured to select the potential subcarriers and order them based on some pre-configured metrics. In selected embodiments, subcarrier ordering is done in a greedy fashion by first selecting a "best" subcarrier (e.g., the subcarrier having the maximum minimum eigenvalue for the interfering channel), and then selecting the next "best" subcarrier, and so on. After selecting i−1 subcarriers, the ith subcarrier is selected as the one whose minimum eigenvalue of the corresponding interfering channel is greater than a predetermined threshold and its chordal distance to the interfering channel of the previously selected subcarriers is greater than another pre-configured threshold. UEs can feed back some information to the transmitters in the form of RI or CQI to reflect this ordering. With this information provided to the transmitter, the transmitter identifies a set of subcarriers (say $w_1, \ldots, w_{n_2}$) that the transmitters want to use interference alignment, and then selects $L_i$ (up to M−1 UEs for single rank UEs) that already reported these subcarriers as their potential subcarriers for interference alignment (the ones with high ranks). Then, the transmitter uses the frequency extension approach described hereinabove.

In the following description, additional embodiments elaborate on certain implementation issues, including the choice of different codebooks discussed above.

Choice of Combining Vector at the Receiver Side

In another embodiment, a different combining for the case of K≥M may be used as follows:

$$R_{i,j} = \left(I + \frac{INR}{L_i} G_{3-i,j}(I - V_{ref}^H V_{ref}) G_{3-i,j}^H\right)^{-1} H_{i,j}(I - V_{ref}^H V_{ref}) H_{i,j}^H, \quad (14)$$

where $$V_{ref} \triangleq \begin{bmatrix} v_{ref}^1 & v_{ref}^2 & \cdots & v_{ref}^{d_{max}^{3-i}} \end{bmatrix}^T.$$

This gives a better received SINR compared to the primary solution.

Choice of $\mathcal{S}_r$.

As was mentioned above, it is assumed that there are known codebooks $\mathcal{S}_r = \{V_r^1, \ldots, V_r^{M_r}\}$, for $r=1, \ldots, M$, in which $V_r^p$ ($p=1, \ldots, M_r$) is a M×r dimensional matrix. It is further assumed that the codebooks $\mathcal{S}_r$ are predefined and known to all UEs and both transmitters. In one embodiment, these codebooks can be the same as precoding codebooks in 3GPP Release 8 or 10.

Each UE j in cell i, requesting a signal of rank $d_j^i$, will select the codebook $\mathcal{S}$, with $r=d_j^i$. Then, the UE will select one of the matrices in this codebook, denoted by $V_{ref}^{i,j}$. According to Equation (2), for all $i=1,2; j=1, \ldots, L_i; l=1, \ldots, d_j^i$, in order to cancel the inter-cell interference, the transmitted signal $x_{3-i}$ (for $i=1,2$) should be in the null space of $V_{ref}^{i,j}$ for all $j=1, \ldots, L_i$. In other words, the transmitted signal $x_{3-i}$ should be in the null space of the union of all these spaces. The union of all these subspaces as the interference subspace for transmitter i is denoted $\mathcal{V}_{int}^i$. The spaces spanned by $V_{ref}^{i,j}$ for all $j=1, \ldots, L_i$ intersect with each other as much as possible, such that the rank for interference subspace is $d_{max}^i$ (i.e. rank ($\mathcal{V}_{int}^i$)=$d_{max}^i$). Also, this subspace is exchanged by the other transmitter, as transmitted signal $x_{3-i}$ should be in the null space of this sub-space. In order to form the precoder for signal $x_{3-i}$ in equation (7), this subspace is needed. Generally, $v_{ref}^1, \ldots$ $$v_{ref}^{d_{max}^{3-i}}$$

in the precoder design (equation (7)) should be replaced with the spanning basis for $\mathcal{V}_{int}^i$.

In order to provide these requirements, one approach is to put the burden on scheduling in the transmitter side. The transmitter selects those UEs that results in the lower rank for the interference subspace. This could be done by selecting those UEs that have the same $V_{ref}^{i,j}$ or part of their $V_{ref}^{i,j}$ is the same. Another approach is to fix a set $\mathcal{V}_{ref} = \{v_{ref}^1, \ldots, v_{ref}^M\}$, where $v_{ref}^l$ is an M dimensional vector. Each UE j in cell i, construct $V_{ref}^{i,j}$ as the concatenation of the first $d_j^i$ vectors in the set $\mathcal{V}_{ref}$. In this approach, all UEs requesting the same rank will pick the same vector.

Another approach may be to employ a combination of the previous techniques. For example, a set of vectors/matrices with specific rules are provided, and UEs are allowed to select among those options. Then transmitter can in turn select among these UEs (with their choices) considering the rank of the interference space. As an example, it is assumed that transmitter and UEs have four antennas. Four sets of $\mathcal{V}_{ref}$ can be defined as $\mathcal{V}_{ref}^1 = \{w_1, \ldots, w_4\}$, $\mathcal{V}_{ref}^2 = \{w_5, \ldots, w_8\}$, $\mathcal{V}_{ref}^3 = \{w_9, \ldots, w_{12}\}$, $\mathcal{V}_{ref}^4 = \{w_{13}, \ldots, w_{16}\}$, where $w_i$ ($i=1, \ldots, 16$) is one of the 16 possible codewords for PMI with rank one in 3GPP release 8. Therefore, the UEs can select one of these sets, based on some criteria. However, in selecting one of these sets, the UEs will choose the first $d_j^i$ vectors of that set as their $V_{ref}^{i,j}$. Other codebooks in 3GPP release 8 or 10 can also be used as well.

Choice of $\mathcal{P}_r$ and Precoding Feedback

In each cell, the users feed back the calculated the $d_j^i \times M$ equivalent channel matrix $H_{i,j}^{eq}$ or some estimate of that. It is assumed that there are known codebooks $\mathcal{P}_r = \{P_r^1, \ldots, P_r^{M_r}\}$, for $r=1, \ldots, M$, in which $P_r^p$ ($p=1, \ldots, M_r$) is a r×M dimensional matrix. It is also assumed that the codebooks $\mathcal{P}_r$ are predefined and known to all UEs and both transmitters. In one embodiment, these codebooks can be the same as precoding codebooks in 3GPP Release 8 or 10.

The UE uses these sets to feed back $H_{i,j}^{eq}$. One way to implement this is for each UE to define the matrix $P_r^{i,j}$ as the precoding matrix for the equivalent channel $H_{i,j}^{eq}$ (It should be noted that this approach is different than 3GPP release 8 or 10 precoding feedback, in that for release 8 or 10 the precoding matrix for the user's channel $H_{i,j}$ to the transmitter is found). Then, each UE feeds back the PMI as the index of the matrix $P_r^{i,j}$ in the set $\mathcal{P}_r$. Any of the methods for finding the precoding matrix in Release 8 or 10 can be used in this regard. For example, in a release 8, PMI-based approach, $P_r^{i,j}$ can be selected as the codeword in $\mathcal{P}_r$ such that it is closest to the eigenvectors of $H_{i,j}^{eq}$.

In one embodiment, the UE can try to feed back the whole equivalent channel $H_{i,j}^{eq}$, rather than the precoding matrix. The codebooks $\mathcal{P}_r$ can be a set of ortho-normal matrices/vectors like previous precoding codebooks. In order to find the codeword, the $j^{th}$ UE in cell i will select the codebook $\mathcal{P}_r$, with $r=d_j^i$ and selects the codeword in the set $\mathcal{P}_r$ which is closest to $H_{i,j}^{eq}$ based on some criteria. Then, it can report back to the transmitter the rank $r=d_j^i$ and the index of the matrix in the codebook (Equivalent Channel Indicator (ECI)). For example, the UE can find the codeword as:

$$P_r^{i,j} = \min_{P \in \mathcal{P}_r} \left\| H_{i,j}^{eq} - \begin{bmatrix} \lambda_1^{i,j} & \cdots & 0 \\ \vdots & \ddots & \vdots \\ 0 & \cdots & \lambda_{d_j^i}^{i,j} \end{bmatrix} P \right\|^2 \quad (20)$$

All $N_i$ UEs in the $i^{th}$ cell feed back the index for matrix $P_r^{i,j}$ in the set $\mathcal{P}$ (ECI) along with values of $\lambda_1^{i,j}, \ldots,$ $$\lambda_{d_j^i}^{i,j}.$$

The UE can also send some or one of the $\lambda$ values. In another embodiment, in equation (5) the diagonal matrix of $\lambda$ can be replaced with a scalar parameter or even with identity matrix (ignoring $\lambda$ values). Each transmitter i has an estimate for the equivalent channels of all affiliated UEs, denoted by $\hat{H}_{i,j}^{eq}$, where $$\hat{H}_{i,j}^{eq} = \begin{bmatrix} \lambda_1^{i,j} & \cdots & 0 \\ \vdots & \ddots & \vdots \\ 0 & \cdots & \lambda_{d_j^i}^{i,j} \end{bmatrix} P_r^{i,j} \quad (21)$$

In this case, the matrices $$P_{d_j^i}^{i,j}$$

in Equation (5) are replaced with $\hat{H}_{i,j}^{eq}$.

Another option is to feedback a codeword which is closest to a basis for the subspace that $H_{i,j}^{eq}$ spans. This basis can be found by any method known in the art, such as for example, including lattice basis reduction techniques. Also, as in the previous example, each UE can try to feed back a representation of $H_{i,j}^{eq}$ in that basis (i.e., including A too).

MU-MIMO Improvements

The disclosed embodiments may be considered as an extended MU-MIMO technique with some coordination between transmitters and UEs. Transmitters only have the knowledge of the equivalent channels of their affiliated users and they do not need to know their corresponding cross channels to the users in the other cell. In other words, only local CSI is needed at each node. Also, as mentioned before, the i$^{th}$ transmitter will schedule $L_i$ users such that $M \geq D^i + d_{max}^{3-i}$.

Most of the current enhancements for MU-MIMO in 3GPP release 10 (including all enhancements for codebook based or non-codebook based MU-MIMO) can be applied to the disclosed embodiments. As mentioned previously, each UE decides on $V_{ref}^{i,j}$, and having the cross channel $G_{3-i,j}^+$ and direct channel $H_{i,j}$, calculates the equivalent channel $H_{i,j}^{eq}$ in (4). Then, the UE finds the best precoding matrix $$P_{d_j^i}^{i,j},$$

e.g., such as in 3GPP release 8 or 10. Thus, each UE feeds back these two vectors/matrices to the transmitter.

In one embodiment, $V_{ref}^{i,j}$ can be the $M \times d_j^i$ matrix containing the worst eigenvectors (eigenvectors corresponding to the lowest eigenvalues) of the channel $G_{3-i,j}$ and $P_{d_j^i}^{i,j}$ can be the best eigenvectors (eigenvectors corresponding to the lowest eigenvalues) of $H_{i,j}^{eq}$. In another embodiment, $(V_{ref}^{i,j})^H$ can be the same as $$P_{d_j^i}^{i,j},$$

containing the best eigenvectors of $H_{i,j}^{eq}$. In this case, the UE need only feed back one of these matrices/vectors. However, in such a case, transmitter selects those UEs that have reported the same $$P_{d_j^i}^{i,j}.$$

In addition, similar to new proposed enhancements to MU-MIMO release 8, the UEs can report back the best/worst eigenvectors of the companion UE or UEs, in addition to $$P_{d_j^i}^{i,j}.$$

Feedback Enhancement

As the quality of CSI at the transmitter side is significant, feedback enhancement is desirable in the present embodiments. One way to improve the feedback would be, for example, sub-space quantization as the transmitted signal is always in the null space of $V_{ref}$. This means that the subspace spanned by $V_{ref}$ does not carry any information and can be ignored in the quantization. This provides less quantization error for the subspace orthogonal to $V_{ref}$ with the same amount of feedback bits. In one embodiment, a codebook $\mathcal{P}_r = \{P_r^1, \ldots, P_r^{M_r}\}$ optimized for the subspace quantization may be designed. In another embodiment, the new codebook can be obtained from the primary codebook by projecting all codewords in the null-space of $V_{ref}$. This provides a flexible solution as the primary codebook does not need to be changed with $V_{ref}$.

Appendix A—UE Selection and Scheduling

In the embodiments discussed herein, it is assumed that the UEs receive interference from one dominant interferer. However, different criteria can be set in order to determine the interference is mainly caused by one interferer. For example, each UE can measure the interference from different sources and when the interference from one source is bigger than the summation of interference caused by other sources, it can be assumed that this source is the dominant interferer.

As indicated previously, the disclosed embodiments may be considered as an extension to MU-MIMO in 3GPP release 8 or 10. On the other hand, when interference is smaller than a threshold, it may be desirable to treat interference as noise. When the UE measures the interference and the dominant interference is less than a pre-determined threshold, it can send RI, PMI, CQI reports back to the transmitter as in 3GPP release 8 or 10. Therefore, the transmitter can support users in MU-MIMO mode as specified in 3GPP release 8 or 10. However, if the user identifies that the threshold is passed, it can indicate the same to the transmitter and send two sets of reports (e.g., in the form of PMI, RI, CQI, etc.). For example, the user can feed back the choice of the codeword in $\mathcal{S}_r$ and the codeword in $P_r$.

The codeword in $P_r$ could represent the best eigenvector of the direct channel (regular PMI as in 3GPP release 8 or 10), the equivalent channel as calculated herein, or any similar value. The codeword in $\mathcal{S}_r$ could represent the worst eigenvector of the interfering channel, the best (or worst) companion of the direct PMI, or any similar value.

Calculation of the Feedback

Assuming each user is assigned part of the resource grid (in time and frequency), as in 3GPP release 8 or 10, for each resource element (an element in time and frequency) a codeword in $\mathcal{S}_r$ and a codeword in $P_r$ can be calculated. However, only one feedback per assigned resource grid is requested (3GPP release 8) or at most one feedback per resource block or a couple of resource blocks should be sent (sub-band feedback, 3GPP release 10). Described below are exemplary methods of calculating the feedback.

One Feedback per Resource Block

Using channel estimation methods, each UE can estimate its channels to both transmitters over each Resource Element (RE). In general, the equivalent channel that needs to be fed back to the corresponding transmitter can be written as a function of these two channels, i.e., $H_{i,j}^{eff} = f(H_{i,j}, G_{3-i,j})$. In one embodiment, each receiver can compute $H_{i,j}(n)$ and $G_{3-i,j}(n)$ over each resource element (RE) indexed by n and then take an average over one Resource Block (RB) them to reveal $$\overline{H}_{i,j} = \frac{1}{N}\sum_{n=1}^{N} H_{i,j}(n) \text{ and } \overline{G}_{3-i,j} = \frac{1}{N}\sum_{n=1}^{N} G_{3-i,j}(n),$$

in which N denotes the number of REs in a RB, and then, compute the equivalent effective channel for the whole RB as $\overline{H}_{i,j}^{eff} = f(\overline{H}_{i,j}, \overline{G}_{3-i,j})$ and the feedback as $\hat{H}_{i,j}^{eq} = \text{quan}(\overline{H}_{i,j}^{eff})$, where quan(.) denotes the quantization function. In another embodiment, first the equivalent channel is computed in each RE, i.e. $H_{i,j}^{eff}(n)=f(H_{i,j}(n),G_{3-i,j}(n))$, and then, the equivalent effective channel for the whole RB is obtained as $$\overline{H}_{i,j}^{eff} = \frac{1}{N}\sum_{n=1}^{N} H_{i,j}^{eff}(n).$$

Then, $\overline{H}_{i,j}^{eff}$ is quantized. In another embodiment, the effective Channel Direction Information (CDI) defined as $$CDI_{i,j}^{eff}(n) = \frac{H_{i,j}^{eff}(n)}{\|H_{i,j}^{eff}(n)\|}$$

is calculated and then the average is taken over $CDI_{i,j}^{eff}(n)$ to reveal $\overline{CDI}_{i,j}^{eff}$. Then, $\overline{CDI}_{i,j}^{eff}$ is quantized.

One Feedback per Resource Group—Subband Feedback

Similar to the previous section, having the equivalent effective channel in RB #k, denoted by $\overline{H}_{i,j}^{eff}(t_k)$, two approaches can be used to report a sub-band feedback:

Taking average over $\overline{H}_{i,j}^{eff}(t_k)$, k=1, . . . , K, where K denotes the number of RBs in the subband, i.e.

$$\overline{H}_{i,j}^{eff} = \frac{1}{K}\sum_{k=1}^{K} \overline{H}_{i,j}^{eff}(t_k),$$

and then quantize $\overline{H}_{i,j}^{eff}$.

Find $\overline{CDI}_{i,j}^{eff}(t_k)$ as $$\frac{\overline{H}_{i,j}^{eff}(t_k)}{\|\overline{H}_{i,j}^{eff}(t_k)\|}$$

and then, take an average over $\overline{CDI}_{i,j}^{eff}(t_k)$ to reveal $\overline{CDI}_{i,j}^{eff}$. Then, quantize $\overline{CDI}_{i,j}^{eff}$ One Feedback Per Assigned Band (Similar to the Previous Section)

UE Scheduling Scheme

Figure 5:
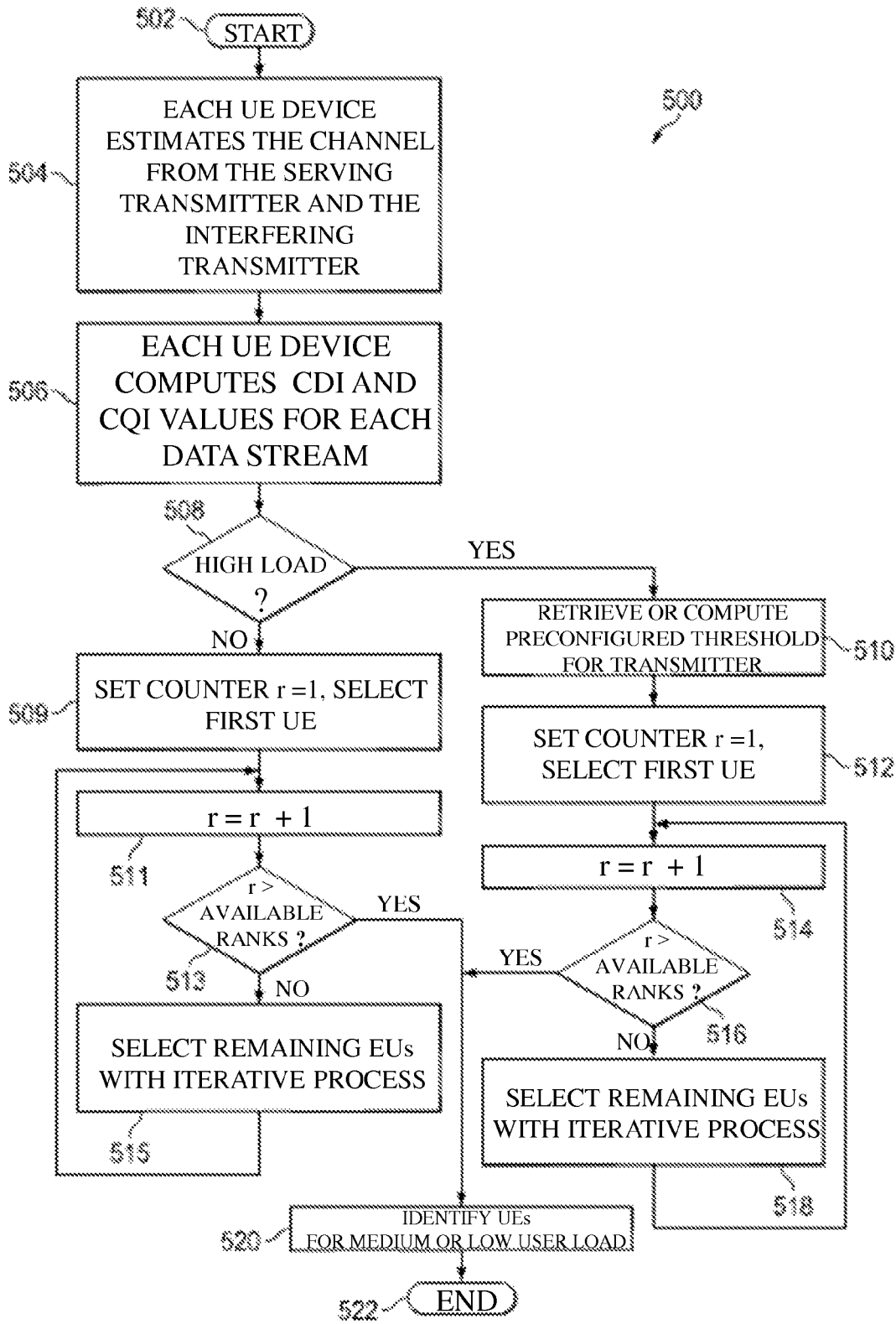
FIG. 5 is a flow chart illustrating a receiver selection process that may be performed when the number of receiver antennas equals or exceeds the number of transmitter antennas.

When the transmitter is selecting $L_i$ UEs in cell i that is less than the total number of UEs ($N_i$), selected embodiments of the present invention provide a low-complexity scheduling and pairing scheme for choosing the UEs that achieves good performance and improves the throughput performance of the system. To illustrate an example receiver selection process, reference is now made to FIG. 5 which depicts in flow chart form a receiver selection process 500 that may be performed in cases when the number of receiver antennas equals or exceeds the number of transmitter antennas (e.g., K≥M). Once the procedure starts (block 502), each $UE_{i,j}$ device estimates the channel from the serving transmitter and the channel from the interfering transmitter (block 504). The UE also estimates or calculates the rank of the direct channel ($d_j^i$) at block 504, such as by using, for example, the same procedure as 3GPP Release 8 LTE or LTE-A. The UE reports back this rank as RI to the serving transmitter and request a signal of rank $d_j^i$. Based on the computed rank, each $UE_{i,j}$ device computes (block 504) its effective direct channel vectors for each requested data stream as $h_{i,j}^{l,eq}=(v_{ref}^l)^H G_{i,j}^+ H_{i,j}$ for l=1, . . . , $d_j^i$ and its effective noise power as $\mathfrak{R}_{i,j}^{l,eff}=E\{\|n_{i,j}^{l,eq}\|^2\}$.

At block 506, each $UE_{i,j}$ device computes channel direction information (CDI) and channel quality information (CQI) values for each $d_j^i$ data streams, such as the following examples:

$$CDI_{i,j}^l \triangleq \frac{h_{i,j}^{l,eq}}{\|h_{i,j}^{l,eq}\|}, CQI_{i,j}^l \triangleq \frac{\|h_{i,j}^{l,eq}\|^2 - |h_{i,j}^{l,eq} v_{ref}^l|^2}{\mathfrak{R}_{i,j}^{l,eff}}, \text{ for } l = 1, \ldots, d_j^i. \quad (24)$$

While each $UE_{i,j}$ device may feed back the computed CDI and CQI values for all requested $d_j^i$ date streams to the corresponding transmitter, it will be appreciated that there might be no need for feeding back $CDI_{i,j}^l$ in the TDD mode when the transmitters can acquire it from the UL channel.

At decision block 508, it is determined if there is a high load that meets or exceeds a threshold level. This decision may be implemented by comparing the total number of UEs ($N_i$) to a threshold load number ($N_{th}$).

If there is a high user load ($N_i \geq N_{th}$), a pre-configured threshold $\gamma_{th}$ is retrieved or computed at block 510 and used by the transmitter $TX_i$ to construct the following set:

$$S_i \triangleq \{(j,l) \mid \beta_{i,j} CQI_{i,j}^l > \gamma_{th}\}, \quad (25)$$

where $\beta_{i,j}$ denotes the scheduling parameter.

At block 512, the transmitter $TX_i$ sets a counter value r=1 and selects the first UE (denoted $s_r$) as follows:

$$(s_r, q_r) = \arg\max_{(j,l)} \beta_{i,j} CQI_{i,j}^l \text{ for } (j,l) \in S_i. \quad (26)$$

In Equation (26) it is possible that a previously selected UE is selected again for considering another rank. Therefore, the rank of the signal for the UE $s_r$ is increased by one: $d_{s_r}=d_{s_r}+1$ to keep track of its rank (the initial value for all $d_j=0$).

At block 514, the counter value r is incremented, and at block 516, the transmitter $TX_i$ determines if the counter value exceeds the number of $M-d_{max}^{3-i}$ available ranks.

At block 518, the remaining UEs are selected with an iterative process for so long as the counter value does not exceed $M-d_{max}^{3-i}$ (e.g., negative outcome to decision block 516). In block 518, the transmitter $TX_i$ defines the set of previously selected UEs as $$S_{i,r-1} \triangleq \{(s_1, q_1), \ldots, (s_{r-1}, q_{r-1})\}.$$

In addition, $\mathcal{P}_{r-1}$ is defined as the sub-space spanned by the CDI vectors of the previously selected UEs, i.e.

$$\mathcal{P}_{r-1} \triangleq \text{span}(CDI_{i,s_1}^{q_1}, \ldots, CDI_{i,s_{r-1}}^{q_{r-1}}).$$

Finally, for all $(j,l) \in S_i - S_{i,r-1}$, the transmitter $TX_i$ defines $p_{i,j}^{l,(r-1)}$ as the projection of $CDI_{i,j}^l$ over $\mathcal{P}_{r-1}$, and then selects $$(s_r, q_r) = \arg\min_{(j,l) \in S_i - S_{i,r-1}} \|p_{i,j}^{l,(r-1)}\|^2. \quad (27)$$

For counter values r=2 to $M-d_{max}^{3-i}$, the process is repeated until the counter value exceeds $M-d_{max}^{3-i}$ (e.g., affirmative outcome to decision block 516). At this point, the UEs selected for the high user load are identified at block 520 as $(s_1, \ldots, s_{Li})$, where the number of selected UEs $L_i$ would be defined as the cardinality of the set $$\{s_1, \ldots, s_{M-d_{max}^{3-i}}\}$$

(which is the number of different users in this set) and the process ends (block 522).

On the other hand, if it is determined (at decision block 508) that there is a medium or low user load ($N_i < N_{th}$), the transmitter $TX_i$ sets a counter value $r=1$ and selects the first UE (denoted $s_r$) at block 509 as follows:

$$(s_r, q_r) = \arg\max_{(j,l)} \beta_{i,j} CQI_{i,j}^l, \text{ for } l=1, \ldots, d_j^i, j=1, \ldots, N_i. \quad (28)$$

In Equation (28) it is possible that a previously selected UE is selected again for considering another rank. Therefore, the rank of the signal for the UE $s_r$ is increased by one: $d_{s_r} = d_{s_r} + 1$ to keep track of its rank (the initial value for all $d_j = 0$).

At block 511, the counter value r is incremented, and at block 513, the transmitter $TX_i$ determines if the counter value exceeds the number of $M - d_{max}^{3-i}$ available ranks.

At block 515, the remaining UEs are selected with an iterative process for so long as the counter value does not exceed $M - d_{max}^{3-i}$ (e.g., negative outcome to decision block 513). In block 515, the transmitter $TX_i$ defines the set of previously selected UEs as $$\mathcal{S}_{i,r-1} \triangleq \{(s_1, q_1), \ldots, (s_{r-1}, q_{r-1})\}.$$

In addition, $\mathcal{P}_{r-1}$ is defined as the sub-space spanned by the CDI vectors of the previously selected UEs, i.e.

$$\mathcal{P}_{r-1} \triangleq \text{span}(CDI_{i,s_1}^{q_1}, \ldots, CDI_{i,s_{r-1}}^{q_{r-1}}).$$

Finally, for all $(j,l) \notin \mathcal{S}_{i,r-1}$, the transmitter $TX_i$ defines $\boldsymbol{p}_{i,j}^{l,(r-1)}$ as the projection of $CDI_{i,j}^l$ over $\mathcal{P}_{r-1}$, and then selects $$(s_r, q_r) = \arg\max_{(j,l) \notin S_{i,r-1}} \beta_{i,j} CQI_{i,j}^l (1 - \|\boldsymbol{p}_{i,j}^{l(r-1)}\|^2). \quad (29)$$

For counter values $r=2$ to $M - d_{max}^{3-i}$, the process is repeated until the counter value exceeds $M - d_{max}^{3-i}$ (e.g., affirmative outcome to decision block 513). At this point, the UEs selected for the medium or low user load are identified at block 520 as $(s_1, \ldots s_{Li})$, where the number of selected UEs $L_i$ would be defined as the cardinality of the set $$\{s_1, \ldots, s_{M-d_{max}^{3-i}}\}$$

(which is the number of different users in this set) and the process ends (block 522).

As described herein, the threshold values $N_{th}$ and $\gamma_{th}$ may be configurable and can be optimized based on the system parameters. By tuning the threshold values, the disclosed selection process chooses UEs having an effective SNR values (approximated by CQI values) that are high enough while maximizing the orthogonality of their equivalent direct channels. The SNR values are calculated for all requested data stream (the requested RI) and all data streams having high enough SNR values will be selected in scheduling procedure. While the selection process for a medium or low user load can be used in the high user load case, it will be appreciated that the selection process for a high user load reduces algorithm complexity and the feedback load (in the FDD mode), since only a portion of the users are considered in the scheduling. This helps reducing the feedback load of CQI to just one bit since the UEs just need to send an acknowledgement bit to their affiliated transmitter indicating that whether or not their effective SNR is above the threshold or not and the actual value of CQI is not important.

In order to select $L_i$ UEs, the transmitter i needs to know the maximum rank $d_{max}^{3-i}$ that the other transmitter is sending. However, at the beginning of the scheduling procedure it is not known. In one embodiment, both transmitters can set $d_{max}^{3-i}$ to its minimum value 1, i.e. $d_{max}^{3-i}=1$. Transmitters can support $L_i$ UEs such that $D^i + d_{max}^{3-i}$ is less than M. After, the procedure 500 ends at block 513 or block 516. The transmitters can negotiate on the values of $d_{max}^{3-i}$. If the transmitter $(3-i)$ asks for a $d_{max}^{3-i} > 1$, the current transmitter i should remove the last $d_{max}^{3-i} - 1$ selected users in $$\mathcal{S}_{i,M-d_{max}^{3-i}-1}$$

and adjust the number of its affiliated UEs $L_i$.

In another embodiment, transmitters can fix the value of $d_{max}^i$ and rejects any request by any UE which is requesting a rank more than $d_{max}^{3-i}$. In other words, if UEs reporting $d_j^i$ CDIs and CQIs for $d_j^i$ data streams in (24), transmitters consider only the first $d_{max}^i$ values for CDI and CQI that maximizes $\beta_{i,j} CQI_{i,j}^l$ in (26) or (28). It will be noted that the accepted rank of each UE is saved in $d_{s_r}$.

Figure 6:
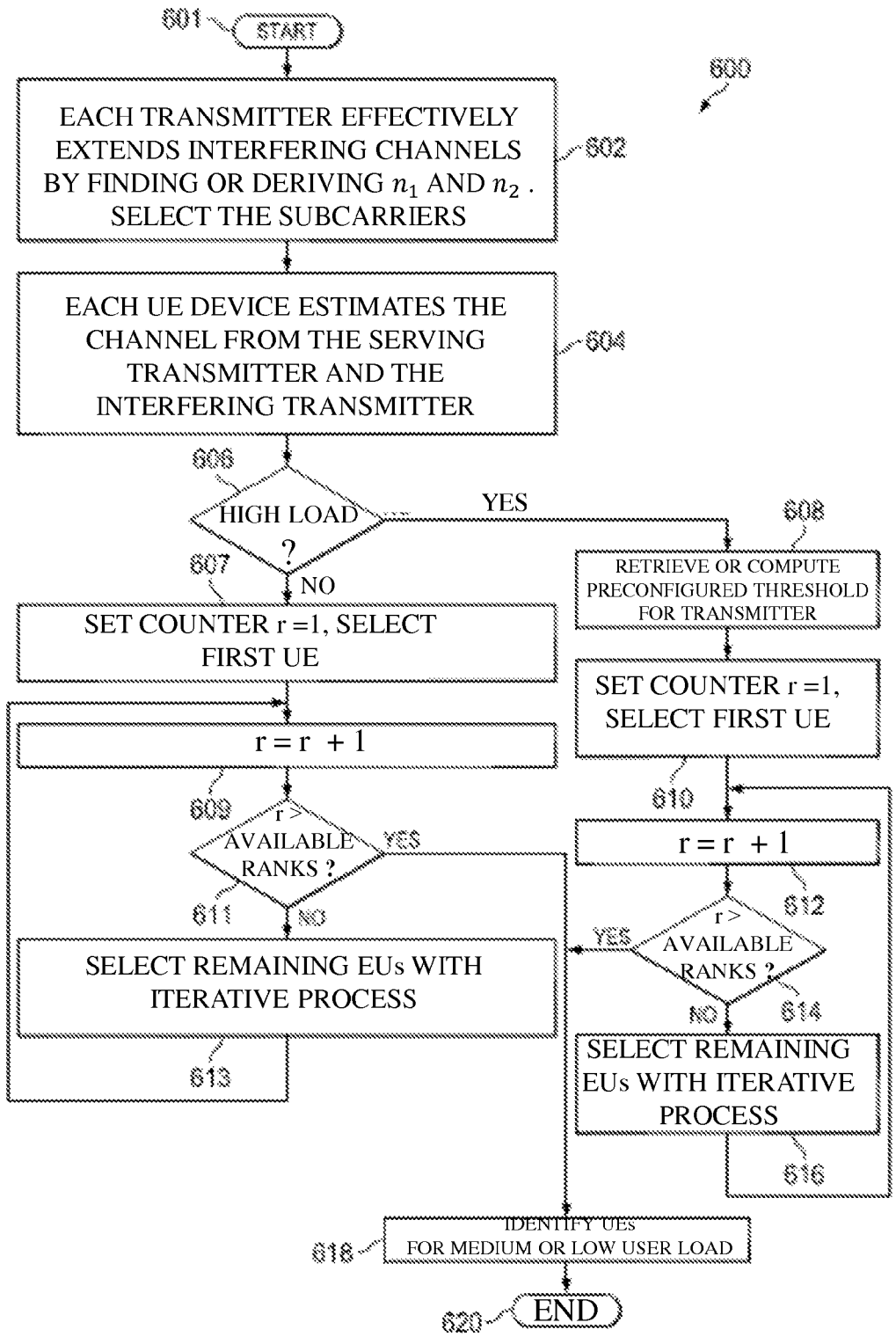
FIG. 6 is a flow chart illustrating a receiver selection process that may be performed to extend the interfering channels in frequency in cases when the number of transmitter antennas exceeds the number of receiver antennas.

Additional receiver scheduling algorithms are disclosed for selecting $L_i$ from $N_i$ total number of UEs when the UE antenna count is less than the transmitter antenna count. To illustrate an example receiver selection process for these embodiments, reference is now made to FIG. 6 which depicts in flow chart form a receiver selection process 600 that may be performed to extend the interfering channels in frequency or time in cases when the number of transmitter antennas exceeds the number of receiver antennas (e.g. K<M). Once the procedure starts (block 601), each transmitter device $T_i$, effectively extends the interfering channels by finding or deriving n1 and n2 (at block 602) that are the smallest integer numbers such that: n1M=n2K (n2>n1). After computing n1 and n2, each transmitter $TX_i$ selects the subcarriers $w_1, \ldots, w_{n2}$ for implementing the proposed scheme and considers the set of $N_i$ UEs that can potentially be considered for the scheduling.

At block 604, each $UE_{i,j}$ device estimates the channel from the serving transmitter and the channel from the interfering transmitter. The UE estimates the rank of the channel ($d_j^i$) for example using the same procedure as 3GPP Release 8 LTE or LTE-A. The UE reports back this rank as RI to the serving transmitter and request a signal of rank $d_j^i$. Then, each $UE_{i,j}$ device estimates their direct and cross channels, and following Equations (11)-(17), each $UE_{i,j}$ device computes its effective direct channel for each $t_k$ as $k_{i,j}^{l,eq}(t_k) = (v_{ref}^i)^H F_{i,j}^{-1}(t_k) K_{i,j}(t_k)$ and their effective noise power as $\mathfrak{R}_{i,j}^{l,eff}(t_k) = E\{|w_{i,j}^{l,eq}(t_k)|^2\}$ for $l=1, \ldots, d_j^i$. In addition, each $UE_{i,j}$ device computes channel direction information (CDI) and channel quality information (CQI) values for each $d_j^i$ data streams and each $t_k$ as follows:

$$CDI_{i,j}^l(t_k) \triangleq \frac{k_{i,j}^{l,eq}(t_k)}{\|k_{i,j}^{l,eq}(t_k)\|}, \qquad (30)$$

$$CQI_{i,j}^l(t_k) \triangleq \frac{\|k_{i,j}^{l,eq}(t_k)\|^2 - |k_{i,j}^{l,eq}(t_k)v_{ref}|^2}{n_{i,j}^{l,eff}(t_k)}, \text{ for } l=1,\ldots,d_j^i.$$

While each $UE_{i,j}$ device may feed back the computed CDI and CQI values for all requested $d_j^i$ date streams to the corresponding transmitter for each $t_k$, it will be appreciated that there might be no need for feeding back $CDI_{i,j}^l(t_k)$ in the TDD mode when the transmitters can acquire it from the UL channel.

At decision block 606, it is determined if there is a high load that meets or exceeds a threshold level. This decision may be implemented by comparing the total number of UEs ($N_i$) to a threshold load number ($N_{th}$).

If there is a high user load ($N_i \geq N_{th}$), a pre-configured threshold $\gamma_{th}$ is retrieved or computed at block 608 and used by the transmitter $TX_i$ to compute following metric for UE (i,j):

$$\phi_{i,j}^l \triangleq \sum_{k=1}^{n1} \beta_{i,j} \log(1 + CQI_{i,j}^l(t_k)), \qquad (31)$$

in which $\beta_{i,j}$ denotes the scheduling parameter. At block 608, the transmitter $TX_i$ also constructs the following set:

$$\mathcal{S}_i \triangleq \{(j,l) \mid \phi_{i,j}^l > \gamma_{th}\}. \qquad (32)$$

At block 610, the transmitter $TX_i$ sets a counter value r=1 and selects the first UE (denoted $s_r$) as follows:

$$(s_1, q_r) = \arg\max_{(j,l)} \phi_{i,j}^l \text{ for } (j,l) \in \mathcal{S}_i. \qquad (33)$$

In Equation (33) it is possible that a previously selected UE is selected again for considering another rank. Therefore, the rank of the signal for the UE $s_r$ is increased by one: $d_{s_r} = d_{s_r}+1$ to keep track of its rank (the initial value for all $d_j=0$).

At block 612, the counter value r is incremented, and at block 614, the transmitter $TX_i$ determines if the counter value exceeds the number of $M-d_{max}^{3-i}$ available ranks.

At block 616, the remaining UEs are selected with an iterative process for so long as the counter value does not exceed $M-d_{max}^{3-i}$ (e.g., negative outcome to decision block 614). In block 616, the transmitter $TX_i$ the set of previously selected UEs as $$\mathcal{S}_{i_{r-1}} \triangleq \{(s_1, q_1), \ldots, (s_{r-1}, q_{r-1})\}.$$

In addition, the transmitter $TX_i$ defines $$\mathcal{P}_{r-1}(t_k) \triangleq \text{span}(CDI_{i,s_1}^{q_1}(t_k), \ldots, CDI_{i,s_{r-1}}^{q_{r-1}}(t_k)).$$

Finally, for all $(j,l) \in \mathcal{S}_i - \mathcal{S}_{i,r-1}$, the transmitter $TX_i$ defines $\wp_{i,j}^{l,(r-1)}(t_k)$ as the projection of $CDI_{i,j}^l(t_k)$ over $\mathcal{P}_{r-1}(t_k)$, and then selects the next UE by computing:

$$s_l = \arg\min_{(j,l) \in \mathcal{S}_i - \mathcal{S}_{i,r-1}} \sum_{k=1}^{n1} \|\wp_{i,j}^{l(r-1)}(t_k)\|^2. \qquad (34)$$

For counter values r=2 to $M-d_{max}^{3-i}$, the process is repeated until the counter value exceeds $M-d_{max}^{3-i}$ (e.g., affirmative outcome to decision block 614). At this point, the UEs selected for the high user load are identified at block 618 as $(s_1, \ldots s_{Li})$, where the number of selected UEs $L_i$ would be defined as the cardinality of the set $$\{s_1, \ldots, s_{M-d_{max}^{3-i}}\}$$

(which is the number of different users in this set) and the process ends (block 620).

If it is determined (at decision block 606) that there is a medium or low user load ($N_i < N_{th}$), the transmitter $TX_i$ sets a counter value r=1 and selects the first UE (denoted $s_r$) at block 607 as follows:

$$(s_r, q_r) = \arg\max_{(j,l)} \phi_{i,j}^l, \text{ for } l=1,\ldots,d_j^i, j=1,\ldots,N_i. \qquad (35)$$

In Equation (35) it is possible that a previously selected UE is selected again for considering another rank. Therefore, the rank of the signal for the UE $s_r$ is increased by one: $d_{s_r} = d_{s_r}+1$ to keep track of its rank (the initial value for all $d_j=0$).

At block 609, the counter value r is incremented, and at block 611, the transmitter $TX_i$ determines if the counter value exceeds the number of $M-d_{max}^{3-i}$ available ranks.

At block 613, the remaining UEs are selected with an iterative process for so long as the counter value does not exceed $M-d_{max}^{3-i}$ (e.g., negative outcome to decision block 611). In block 615, the transmitter $TX_i$ defines the set of previously selected UEs as $$\mathcal{S}_{i_{r-1}} \triangleq \{(s_1, q_1), \ldots, (s_{r-1}, q_{r-1})\}.$$

The transmitter also defines $$\mathcal{P}_{r-1}(t_k) \triangleq \text{span}(CDI_{i,s_1}^{q_1}(t_k), \ldots, CDI_{i,s_{r-1}}^{q_{r-1}}(t_k)).$$

Finally, for all $(j,l) \notin \mathcal{S}_{i,r-1}$, the transmitter $TX_i$ defines $\wp_{i,j}^{l,(r-1)}(t_k)$ as the projection of $CDI_{i,j}^l(t_k)$ over $\mathcal{P}_{r-1}(t_k)$, and then selects the next UE by computing:

$$(s_r, q_r) = \arg\max_{(j,l) \notin \mathcal{S}_{i,r-1}} \sum_{k=1}^{n1} \beta_{i,j} \log\left(1 + CQI_{i,j}^l(t_k)\left(1 - \|\wp_{i,j}^{l(r-1)}\|^2\right)\right) \qquad (36)$$

For counter values r=2 to $M-d_{max}^{3-i}$, the process is repeated until the counter value exceeds $L_i$ (e.g., affirmative outcome to decision block 611). At this point, the UEs selected for the medium or low user load are identified at block 618 as $(s_1, \ldots s_{Li})$, where the number of selected UEs $L_i$ would be defined as the cardinality of the set $\{s_1, \ldots, s_{M-d_{max}^{3-i}}\}$ (which is the number of different users in this set) and the process ends (block 620).

Again, it will be appreciated that threshold parameters $N_{th}$ and $\gamma_{th}$ can be optimized based on the system parameters. The UE selection algorithm proposed for the case of K<M is very similar to the one proposed for the case of K≥M, with the difference that the same set of UEs must be scheduled for all subcarriers $w_1, \ldots, w_{n2}$. As a result, it is possible to select UEs with fairly good channels in all subcarriers for the case of K<M.

In the case where Euclidean Distance Minimization techniques are used to find a combining vector for cases where the UE antenna count K is less than the transmitter antenna count M, the scheduling algorithm can be the same as in the case of K≥M except for the calculation of the CQI values. In particular, since in this case the inter-cell interference cannot be eliminated, CQI may reflect the inter-cell interference for better scheduling performance. For this purpose, CQIs for UE (i,j) may be defined as follows:

$$CQI_{i,j}^l \triangleq \frac{\frac{P_i}{D^i}(\|h_{i,j}^{l,\text{eff}}\|^2 - |h_{i,j}^{l,\text{eff}} v_{\text{ref}}^l|^2)}{\left(1 - \frac{|(v_{\text{ref}}^l)^H G_{i,j}^+ G_{i,j} v_{\text{ref}}^l|^2}{\|(v_{\text{ref}}^l)^H G_{i,j}^+ G_{i,j}\|^2}\right)\frac{P_{3-i}}{M-1} + E\{|n_{i,j}^{l,eq}|^2\}} \quad (37)$$

where $h_{i,j}^{l,\text{eff}} = (v_{\text{ref}}^l)^H G_{i,j}^+ H_{i,j}$. Having CQI defined as above, one may follow the same scheduling algorithm as in the case of K≥M (shown in FIG. 5).

In the interference alignment schemes disclosed herein which use a fixed, globally-known predetermined and "indexed" list of linearly independent vectors $v_{\text{ref}} = \{v_{\text{ref}}^1, \ldots, v_{\text{ref}}^M\}$, multiple codebook-based $v_{\text{ref}}$s (or downloadable) scheme may be used to improve system performance in a way similar to the use of multiple codebooks for precoding matrix information (PMI) in LTE or LTE-A. In selected embodiments, a rotational codebook-based $v_{\text{ref}}$ scheme is employed wherein each transmitter $TX_i$ and its associated UEs switch to one of different possible sets based on a pre-determined order or sequence. The order can be cell-specific or the same for all cells, but in either case, no additional signaling is required to tell the UEs which set $v_{\text{ref}}$ is being used at a certain time since the order is known to all UEs.

As seen from the foregoing, the disclosed interference alignment techniques provide significant multiplexing gains with good performance and reduced complexity to address interference between two transmitters, each serving the maximum possible number of UEs simultaneously, while only requiring local CSI knowledge at nodes. For example, the disclosed IA schemes provide acceptable performance with local-only or partial CSI assumptions at the transmitters, thereby avoiding the requirement of large feedback overhead that the current LTE cellular networks and even LTE-A cannot handle. In addition, the disclosed IA schemes do not require a large amount of coordination between the nodes that increases dramatically when the number of coordinating nodes increases. Moreover, by eliminating the requirement of large global channel feedback, the feedback challenges associated with high mobility scenarios and feedback delay are avoided.

In order to provide the CSI from different users, a codebook based approach similar to 3GPP release 8 or 10 is used. Previously, the users feed back an equivalent channel matrix. Here, it is assumed users feed back a matrix from a codebook which is closest to its equivalent channel matrix (using some criteria). In addition, the required fixed vectors among transmitters and UEs can be determined using a codebook based feedback by UEs. Using this technique, the inter-cell interference is removed; however, the intra-cell interference is reduced through a MU-MIMO scheme.

Figure 7:
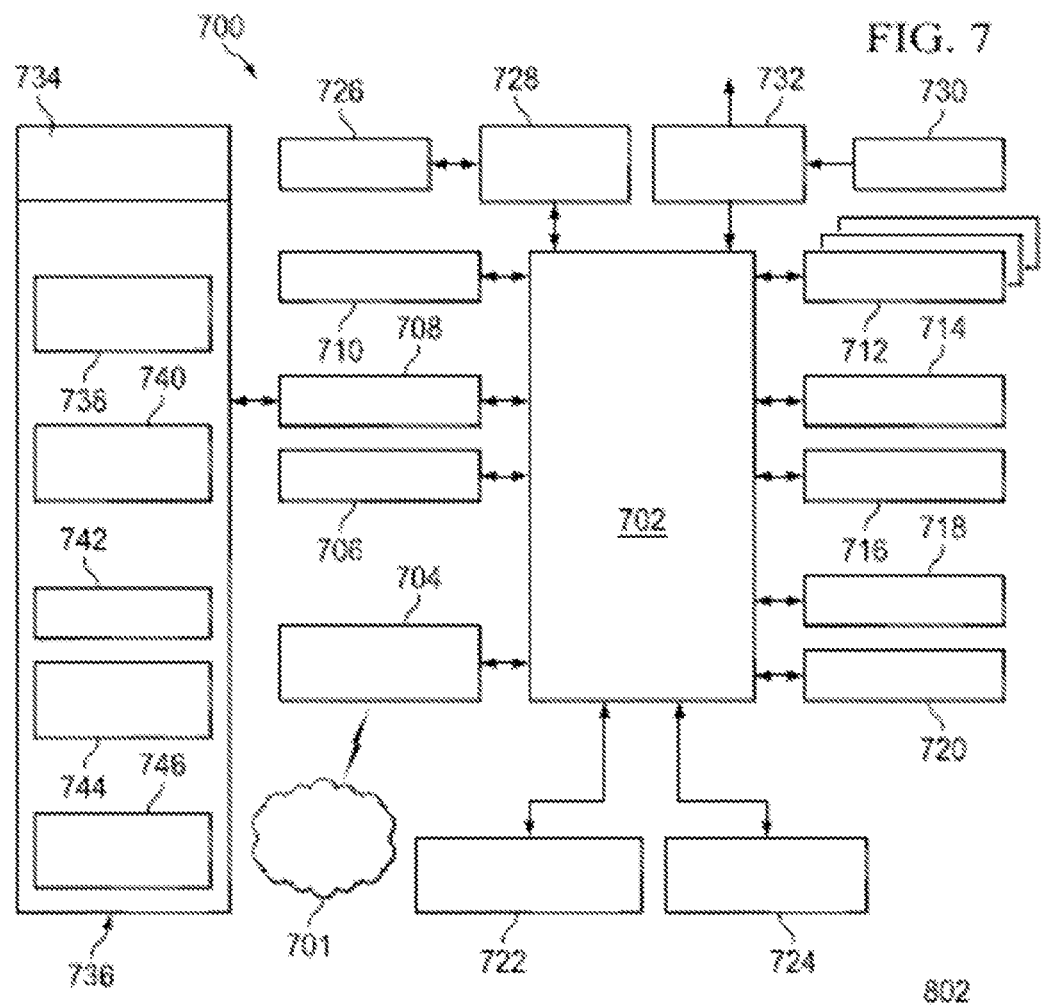
FIG. 7 is a block diagram of a user equipment device.

Referring now to FIG. 7, there is shown a schematic block diagram illustrating exemplary components of a mobile wireless communications or user equipment device 700 which may be used with selected embodiments of the present invention. The wireless device 700 is shown with specific components for implementing features described above. It is to be understood that the wireless device 700 is shown with very specific details for exemplary purposes only. As depicted, user equipment 700 includes a number of components such as a main processor 702 that controls the overall operation of user equipment 700. Communication functions, including data and voice communications, are performed through a communication subsystem 704. The communication subsystem 104 receives messages from and sends messages to a wireless network 701. In this illustrative embodiment of user equipment 700, communication subsystem 704 is configured in accordance with the Global System for Mobile Communication (GSM) and General Packet Radio Services (GPRS) standards. The GSM/GPRS wireless network is used worldwide and these standards may be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 704 with the wireless network 701 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 701 associated with user equipment 700 is a GSM/GPRS wireless network in one implementation, other wireless networks may also be associated with user equipment 700 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future generation networks like EDGE, UMTS, WiMAX, LTE and LTE-A. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 702 also interacts with additional subsystems such as a Random Access Memory (RAM) 706, a flash memory 708, a display 710, an auxiliary input/output (I/O) subsystem 712, a data port 714, a keyboard 716, a speaker 718, a microphone 720, short-range communications 722, and other device subsystems 724.

Some of the subsystems of the user equipment 700 perform communication-related functions, whereas other subsystems may provide "resident" or on-device functions. By way of example, the display 710 and the keyboard 716 may be used for both communication-related functions, such as entering a text message for transmission over the network 701, and device-resident functions such as a calculator or task list.

The user equipment 700 can send and receive communication signals over the wireless network 701 after required network registration or activation procedures have been completed. Network access is associated with a subscriber or user of the user equipment 700. To identify a subscriber, the user equipment 700 requires a SIM/RUIM card 726 (i.e. Subscriber Identity Module or a Removable User Identity Module) to be inserted into a SIM/RUIM interface 728 in order to communicate with a network. The SIM card or RUIM 726 is one type of a conventional "smart card" that can be used to identify a subscriber of the user equipment 700 and to personalize the user equipment 700, among other things. Without the SIM card 726, the user equipment 700 is not fully operational for communication with the wireless network 701. By inserting the SIM card/RUIM 726 into the SIM/RUIM interface 728, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 726 includes a processor and memory for storing information. Once the SIM card/RUIM 726 is inserted into the SIM/RUIM interface 728, it is coupled to the main processor 702. In order to identify the subscriber, the SIM card/RUIM 726 can include some user parameters such as an International Mobile Subscriber Identity (IMSI). An advantage of using the SIM card/RUIM 726 is that a subscriber is not necessarily bound by any single physical user equipment. The SIM card/RUIM 726 may store additional subscriber information for user equipment as well, including datebook (or calendar) information and recent call information. Alternatively, user identification information can also be programmed into the flash memory 708.

The user equipment 700 is a battery-powered device and includes a battery interface 732 for receiving one or more rechargeable batteries 730. In at least some embodiments, the battery 730 can be a smart battery with an embedded microprocessor. The battery interface 732 is coupled to a regulator (not shown), which assists the battery 730 in providing power V+ to the user equipment 700. Although current technology makes use of a battery, future technologies such as micro fuel cells may provide the power to the user equipment 700.

The user equipment 700 also includes an operating system 734 and software components 736 which are described in more detail below. The operating system 734 and the software components 736 that are executed by the main processor 702 are typically stored in a persistent store such as the flash memory 708, which may alternatively be a read-only memory (ROM) or similar storage element (not shown). Those skilled in the art will appreciate that portions of the operating system 734 and the software components 736 such as specific device applications, or parts thereof, may be temporarily loaded into a volatile store such as the RAM 706. Other software components can also be included, as is well known to those skilled in the art.

The subset of software components 736 that control basic device operations, including data and voice communication applications, will normally be installed on the user equipment 700 during its manufacture. Other software applications include a message application 738 that can be any suitable software program that allows a user of the user equipment 700 to send and receive electronic messages. Various alternatives exist for the message application 738 as is well known to those skilled in the art. Messages that have been sent or received by the user are typically stored in the random access or flash memory 708 of the user equipment 700 or some other suitable storage element in the user equipment 700. In at least some embodiments, some of the sent and received messages may be stored remotely from the device 700 such as in a data store of an associated host system that the user equipment 700 communicates with.

The software applications can further include a device state module 740, a Personal Information Manager (PIM) 742, and other suitable modules (not shown). The device state module 740 provides persistence, i.e. the device state module 740 ensures that important device data is stored in persistent memory, such as the flash memory 708, so that the data is not lost when the user equipment 700 is turned off or loses power.

The PIM 742 includes functionality for organizing and managing data items of interest to the user, such as, but not limited to, e-mail, contacts, calendar events, voice mails, appointments, and task items. A PIM application has the ability to send and receive data items via the wireless network 701. PIM data items may be seamlessly integrated, synchronized, and updated via the wireless network 701 with the user equipment subscriber's corresponding data items stored or associated with a host computer system. This functionality creates a mirrored host computer on the user equipment 700 with respect to such items. This can be particularly advantageous when the host computer system is the user equipment subscriber's office computer system.

The user equipment 700 also includes a connect module 744, and an IT policy module 746. The connect module 744 implements the communication protocols that are required for the user equipment 700 to communicate with the wireless infrastructure and any host system, such as an enterprise system, that the user equipment 700 is authorized to interface with. Examples of a wireless infrastructure and an enterprise system are given in FIG. 9 described in more detail below.

The connect module 744 includes a set of APIs that can be integrated with the user equipment 700 to allow the user equipment 700 to use any number of services associated with the enterprise system. The connect module 744 allows the user equipment 700 to establish an end-to-end secure, authenticated communication pipe with the host system. A subset of applications for which access is provided by the connect module 744 can be used to pass IT policy commands from the host system to the user equipment 700. This can be done in a wireless or wired manner. These instructions can then be passed to the IT policy module 746 to modify the configuration of the device 700. Alternatively, in some cases, the IT policy update can also be done over a wired connection.

The IT policy module 746 receives IT policy data that encodes the IT policy. The IT policy module 746 then ensures that the IT policy data is authenticated by the user equipment 700. The IT policy data can then be stored in the flash memory 708 in its native form. After the IT policy data is stored, a global notification can be sent by the IT policy module 746 to all of the applications residing on the user equipment 700. Applications for which the IT policy may be applicable then respond by reading the IT policy data to look for IT policy rules that are applicable.

The IT policy module 746 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 746 can determine which applications are affected by the IT policy data and send a notification to only those applications. In either of these cases, for applications that aren't running at the time of the notification, the applications can call the parser or the IT policy module 746 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore, the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 746 sends an acknowledgement back to the host system to indicate that the IT policy data was received and successfully applied.

Other types of software applications can also be installed on the user equipment 700. These software applications can be third party applications, which are added after the manufacture of the user equipment 700. Examples of third party applications include games, calculators, utilities, etc.

The additional applications can be loaded onto the user equipment 700 through at least one of the wireless network 701, the auxiliary I/O subsystem 712, the data port 714, the short-range communications subsystem 722, or any other suitable device subsystem 724. This flexibility in application installation increases the functionality of the user equipment 700 and may provide enhanced on-device functions, communication-related functions, or both. For example, secure communication applications may enable electronic commerce functions and other such financial transactions to be performed using the user equipment 700.

The data port 714 enables a subscriber to set preferences through an external device or software application and extends the capabilities of the user equipment 700 by providing for information or software downloads to the user equipment 700 other than through a wireless communication network. The alternate download path may, for example, be used to load an encryption key onto the user equipment 700 through a direct, and thus reliable and trusted connection, to provide secure device communication.

The data port 714 can be any suitable port that enables data communication between the user equipment 700 and another computing device. The data port 714 can be a serial or a parallel port. In some instances, the data port 714 can be a USB port that includes data lines for data transfer and a supply line that can provide a charging current to charge the battery 730 of the user equipment 700.

The short-range communications subsystem 722 provides for communication between the user equipment 700 and different systems or devices, without the use of the wireless network 701. For example, the subsystem 722 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 704 and input to the main processor 702. The main processor 702 will then process the received signal for output to the display 710 or alternatively to the auxiliary I/O subsystem 712. A subscriber may also compose data items, such as e-mail messages, for example, using the keyboard 716 in conjunction with the display 710 and possibly the auxiliary I/O subsystem 712. The auxiliary subsystem 712 may include devices such as: a touch screen, mouse, track ball, infrared fingerprint detector, or a roller wheel with dynamic button pressing capability. The keyboard 716 is preferably an alphanumeric keyboard or telephone-type keypad. However, other types of keyboards may also be used. A composed item may be transmitted over the wireless network 200 through the communication subsystem 704.

For voice communications, the overall operation of the user equipment 700 is substantially similar, except that the received signals are output to the speaker 718, and signals for transmission are generated by the microphone 720. Alternative voice or audio I/O subsystems, such as a voice message recording subsystem, can also be implemented on the user equipment 700. Although voice or audio signal output is accomplished primarily through the speaker 718, the display 710 can also be used to provide additional information such as the identity of a calling party, duration of a voice call, or other voice call related information.

Figure 8:
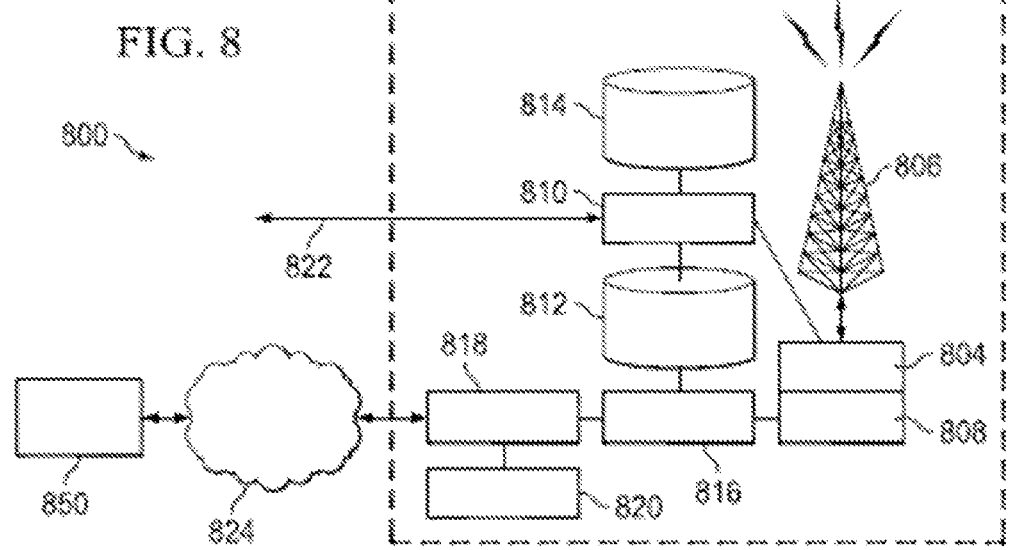
FIG. 8 is a block diagram of a node of a wireless network.

Referring now to FIG. 8, there is depicted a block diagram of an illustrative implementation of a node 802 of the wireless network 701. In practice, the wireless network 701 comprises one or more nodes 802. In conjunction with the connect module 744, the user equipment 700 can communicate with the node 802 within the wireless network 701. In the illustrative implementation 800, the node 802 is configured in accordance with General Packet Radio Service (GPRS) and Global Systems for Mobile (GSM) technologies. However, in other embodiments, node 802 may be configured in accordance with Long Term Evolution (LTE) technology, LTE-Advanced, or IEEE WiMAX. The node 802 includes a base station controller (BSC) 804 with an associated tower station 806, a Packet Control Unit (PCU) 808 added for GPRS support in GSM, a Mobile Switching Center (MSC) 810, a Home Location Register (HLR) 812, a Visitor Location Registry (VLR) 814, a Serving GPRS Support Node (SGSN) 816, a Gateway GPRS Support Node (GGSN) 818, and a Dynamic Host Configuration Protocol (DHCP) 820. This list of components is not meant to be an exhaustive list of the components of every node 802 within a GSM/GPRS network, but rather a list of components that are commonly used in communications through the network 701.

In a GSM network, the MSC 810 is coupled to the BSC 804 and to a landline network, such as a Public Switched Telephone Network (PSTN) 822 to satisfy circuit switched requirements. The connection through the PCU 808, the SGSN 816 and the GGSN 818 to a public or private network (Internet) 824 (also referred to herein generally as a shared network infrastructure) represents the data path for GPRS capable user equipments 850. In a GSM network extended with GPRS capabilities, the BSC 804 also contains the Packet Control Unit (PCU) 808 that connects to the SGSN 816 to control segmentation, radio channel allocation and to satisfy packet switched requirements. To track the location of the user equipment 700 and availability for both circuit switched and packet switched management, the HLR 812 is shared between the MSC 810 and the SGSN 816. Access to the VLR 814 is controlled by the MSC 810.

The station 806 is a fixed transceiver station and together with the BSC 804 form fixed transceiver equipment. The fixed transceiver equipment provides wireless network coverage for a particular coverage area commonly referred to as a "cell". The fixed transceiver equipment transmits communication signals to, and receives communication signals from, user equipments within its cell via the station 806. The fixed transceiver equipment normally performs such functions as modulation and possibly encoding or encryption of signals to be transmitted to the user equipment 700 in accordance with particular, usually predetermined, communication protocols and parameters, under control of its controller. The fixed transceiver equipment similarly demodulates and possibly decodes and decrypts, if necessary, any communication signals received from the user equipment 700 within its cell. Communication protocols and parameters may vary between different nodes. For example, one node may employ a different modulation scheme and operate at different frequencies than other nodes.

For all user equipment 700 registered with a specific network, permanent configuration data such as a user profile is stored in the HLR 812. The HLR 812 also contains location information for each registered user equipment and can be queried to determine the current location of a user equipment device. The MSC 810 is responsible for a group of location areas and stores the data of the user equipment devices currently in its area of responsibility in the VLR 814. Further, the VLR 814 also contains information on user equipment devices that are visiting other networks. The information in the VLR 814 includes part of the permanent user equipment data transmitted from the HLR 812 to the VLR 814 for faster access. By moving additional information from a remote HLR 812 node to the VLR 814, the amount of traffic between these nodes can be reduced so that voice and data services can be provided with faster response times and at the same time requiring less use of computing resources.

The SGSN 816 and the GGSN 818 are elements added for GPRS support; namely, packet switched data support, within GSM. The SGSN 816 and the MSC 810 have similar responsibilities within the wireless network 701 by keeping track of the location of each user equipment 700. The SGSN 816 also performs security functions and access control for data traffic on the wireless network 701. The GGSN 818 provides internetworking connections with external packet switched networks and connects to one or more SGSN's 816 via an Internet Protocol (IP) backbone network operated within the network 701. During normal operations, a given user equipment 700 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 820 connected to the GGSN 818. There are many mechanisms for dynamic IP assignment, including using a combination of a Remote Authentication Dial-In User Service (RADIUS) server and a DHCP server. Once the GPRS Attach is complete, a logical connection is established from a user equipment 700, through the PCU 808, and the SGSN 816 to an Access Point Node (APN) within the GGSN 818. The APN represents a logical end of an IP tunnel that can either access direct Internet compatible services or private network connections. The APN also represents a security mechanism for the network 701, insofar as each user equipment 700 must be assigned to one or more APNs and user equipments 700 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 701. To maximize use of the PDP Contexts, the network 701 will run an idle timer for each PDP Context to determine if there is a lack of activity. When a user equipment 700 is not using its PDP Context, the PDP Context can be de-allocated and the IP address returned to the IP address pool managed by the DHCP server 820.

As will thus be appreciated, in a wireless communication system comprising multiple transmitters each having multiple transmit antennas, a method for operating a receiver having multiple receive antennas to process a signal from a first affiliated transmitter and align interference from a second interfering transmitter includes providing a codebook comprising predefined matrices in the receiver, each predefined matrix having an identifier associated therewith; assembling a first channel matrix and a second channel matrix for the first affiliated transmitter and the interfering transmitters, respectively; determining an equivalent direct channel matrix from the assembled first and second channel matrices; selecting predetermined reference vectors from a plurality of predetermined vectors; selecting a predefined matrix from the codebook based upon the equivalent direct channel matrix; feeding back to the first affiliated transmitter an identifier for the selected predefined matrix; and receiving a signal, and decoding the signal using a combining matrix derived from the predetermined reference vectors and an inverse of the second channel matrix, thereby reducing interference from the interfering transmitters.

As will be further appreciated, in a wireless communication system comprising multiple transmitters each having multiple transmit antennas, a method for transmitting a signal from a first transmitter to a receiver having multiple receive antennas, includes acquiring, at the first transmitter, an identifier for a selected predefined matrix from a codebook, wherein the matrix represents an estimate of a determined equivalent direct channel matrix from each of the multiple receivers; obtaining a second transmitter maximum rank value from a second transmitter which corresponds to a maximum transmission rank for any receiver affiliated with the second transmitter; selecting a subset of the multiple receivers and corresponding ranks for each selected receiver to receive a signal from the first transmitter such that the number of transmit antennas is not less than a sum of the corresponding ranks plus the second transmitter maximum rank; and computing a precoding matrix using the acquired matrix selected from the codebook and one or more predefined reference vectors for a signal to be transmitted to the selected subset of receivers to reduce or eliminate interference to any receivers receiving signals from the first transmitter or from the second transmitter.

In still another embodiment, a computer readable storage medium has computer readable instructions stored thereon that, when executed by a computer, implement in a wireless communication system comprising multiple transmitters each having multiple transmit antennas, a method for operating a receiver having multiple receive antennas to process a signal from a first affiliated transmitter and align interference from a second interfering transmitter. The method includes providing a codebook comprising predefined matrices in the receiver, each predefined matrix having an identifier associated therewith; assembling a first channel matrix and a second channel matrix for the first affiliated transmitter and the interfering transmitters, respectively; determining an equivalent direct channel matrix from the assembled first and second channel matrices; selecting predetermined reference vectors from a plurality of predetermined vectors; selecting a predefined matrix from the codebook based upon the equivalent direct channel matrix; feeding back to the first affiliated transmitter an identifier for the selected predefined matrix; and receiving a signal, and decoding the signal using a combining matrix derived from the predetermined reference vectors and an inverse of the second channel matrix, thereby reducing interference from the interfering transmitters.

In still another embodiment, a computer readable storage medium has computer readable instructions stored thereon that, when executed by a computer, implement in a wireless communication system comprising multiple transmitters each having multiple transmit antennas, a method for transmitting a signal from a first transmitter to a receiver having multiple receive antennas. The method includes acquiring, at the first transmitter, an identifier for a selected predefined matrix from a codebook, wherein the matrix represents an estimate of a determined equivalent direct channel matrix from each of the multiple receivers; obtaining a second transmitter maximum rank value from a second transmitter which corresponds to a maximum transmission rank for any receiver affiliated with the second transmitter; selecting a subset of the multiple receivers and corresponding ranks for each selected receiver to receive a signal from the first transmitter such that the number of transmit antennas is not less than a sum of the corresponding ranks plus the second transmitter maximum rank; and computing a precoding matrix using the acquired matrix selected from the codebook and one or more predefined reference vectors for a signal to be transmitted to the selected subset of receivers to reduce or eliminate interference to any receivers receiving signals from the first transmitter or from the second transmitter.

In still another embodiment, a user equipment (UE) device is configured to align interference and receive signaling over first and second channels from a first affiliated transmitter and a second interfering transmitter. The UE includes an array of receive antennas configured to receive one or more signals over first and second channels from the first and second transmitters; and a processor. The processor is configured to: assemble a first channel matrix and a second channel matrix for the first affiliated transmitter and the second interfering transmitter, respectively; determine an equivalent direct channel matrix from the assembled first and second channel matrices; select predetermined reference vectors from a plurality of predetermined vectors; select, from a codebook, a predefined matrix based upon the equivalent direct channel matrix, the codebook comprising predefined matrices in the receiver and the transmitters, each predefined matrix having an identifier associated therewith; feed back to the first affiliated transmitter an identifier for the selected predefined matrix; and receive a signal, and decode the signal using a combining matrix derived from the predetermined reference vectors and an inverse of the second channel matrix, thereby reducing interference from the interfering transmitters.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. In a wireless communication system comprising multiple transmitters each having multiple transmit antennas, a method for operating a receiver having multiple receive antennas to process a signal from a first affiliated transmitter and align interference from a second interfering transmitter, the method comprising:
   providing a codebook comprising predefined matrices in the receiver, each predefined matrix having an identifier associated therewith;
   assembling a first channel matrix and a second channel matrix for the first affiliated transmitter and the interfering transmitters, respectively;
   determining an equivalent direct channel matrix from the assembled first and second channel matrices;
   selecting predetermined reference vectors from a plurality of predetermined vectors;
   selecting a predefined matrix from the codebook based upon the equivalent direct channel matrix;
   feeding back to the first affiliated transmitter an identifier for the selected predefined matrix; and
   receiving a signal, and decoding the signal using a combining matrix derived from the predetermined reference vectors and an inverse of the second channel matrix, thereby reducing interference from the interfering transmitters,
   wherein:
      the receiver is a rank d receiver having K receive antennas;
      the first affiliated transmitter and second interfering transmitters each have M transmit antennas;
      the equivalent direct channel matrix is computed from the first and second channel matrices and d predetermined reference vectors V ref selected from a plurality of M predetermined vectors;
      the codebook comprising predefined matrices is also provided to the transmitters;
      the selected predefined matrix represents an estimate of the computed equivalent direct channel matrix; and
      a combining matrix is applied to decode rank d data signals received at the receiver, where the combining matrix is derived from the d predetermined reference vectors and an inverse of the second channel matrix to project all cross channels from the second interfering transmitter to the d predetermined reference vectors to reduce or eliminate interference from the second interfering transmitter.

2. The method of claim 1, wherein assembling the first channel matrix and the second channel matrix comprises:
   receiving pilot signals from the first affiliated transmitter and the second interfering transmitter; and
   determining a direct channel matrix H for the first affiliated transmitter and a cross channel matrix G for the second interfering transmitter based on the pilot signals.

3. The method of claim 1, wherein computing the equivalent direct channel matrix comprises computing a product of a complex transpose of predetermined reference vector or a matrix with d predetermined reference vectors and an inverse of the second channel matrix $G^+$ and the first channel matrix H.

4. The method of claim 1, wherein the fed back matrix selected from a codebook is one that is closest to the computed equivalent direct channel matrix.

5. The method of claim 1, wherein the fed back matrix selected from a codebook matrix is one with which a spanned subspace is closest to a subspace spanned by the computed equivalent direct channel matrix.

6. The method of claim 1, further comprising estimating signal to interference plus noise ratio (SINR) using the following equation:

$$SINR_{i,j} \approx \frac{1}{d_j^i}\left|I + \frac{SNR}{L_i}H_{i,j}^{eq}P_{d_j^i}^{i,j}P_{d_j^i}^{i,jH}H_{i,j}^{eqH}\left(\text{Cov}(n_{i,j}^{eq}) + \frac{SNR}{L_i}H_{i,j}^{eq}\Psi_{d_j^i}^{i,j}\Psi_{d_j^i}^{i,jH}H_{i,j}^{eqH}\right)^{-1}\right| - 1;$$

where $$\Psi_{d_j^i}^{i,j}$$

denotes the null space of $$P_{d_j^i}^{i,j}.$$

7. The method of claim 1, wherein for a case of K≥M, the combining matrix is derived in accordance with the following expression:

$$R_{i,j} = \left(I + \frac{INR}{L_i}G_{3-i,j}(I - V_{ref}^H V_{ref})G_{3-i,j}^H\right)^{-1} H_{i,j}(I - V_{ref}^H V_{ref})H_{i,j}^H,$$

$$\text{where } V_{ref} \triangleq \begin{bmatrix} v_{ref}^1 & v_{ref}^2 & \ldots & v_{ref}^{d_{max}^{3-i}} \end{bmatrix}^T.$$

8. The method of claim 1, further comprising performing the feedback by sub-space quantization such that a transmitted signal is always in the null space of $V_{ref}$.

9. The method of claim 8, further comprising configuring a new codebook $P_r = \{P_r^1, \ldots, P_r^{M_r}\}$ optimized for the subspace quantization.

10. The method of claim 8, further comprising configuring a new codebook by projecting all codewords of the codebook in the null-space of $V_{ref}$.

11. In a wireless communication system comprising multiple transmitters each having multiple transmit antennas, a method for transmitting a signal from a first transmitter to a receiver having multiple receive antennas, the method comprising:

acquiring, at the first transmitter, an identifier for a selected predefined matrix from a codebook, wherein the matrix represents an estimate of a determined equivalent direct channel matrix from each of the multiple receivers;

obtaining a second transmitter maximum rank value from a second transmitter which corresponds to a maximum transmission rank for any receiver affiliated with the second transmitter;

selecting a subset of the multiple receivers and corresponding ranks for each selected receiver to receive a signal from the first transmitter such that the number of transmit antennas is not less than a sum of the corresponding ranks plus the second transmitter maximum rank; and computing a precoding matrix using the acquired matrix selected from the codebook and one or more predefined reference vectors for a signal to be transmitted to the selected subset of receivers to reduce or eliminate interference to any receivers receiving signals from the first transmitter or from the second transmitter, wherein the selected subset of receivers are those that result in a lower rank for interference subspace.

12. The method of claim 10, wherein the selected subset of receivers are those that have a same reference vector or vectors, or have or part of a same reference vector or vectors.

13. The method of claim 10, wherein the selected subset of receivers select a reference vector from among a defined set.

14. The method of claim 10, wherein the acquired matrix is fed back by sub-space quantization such that the signal to be transmitted is always in the null space of the one or more predefined reference vectors $V_{ref}$.

15. The method of claim 14, wherein a new codebook $P_r = \{P_r^1, \ldots, P_r^{M_r}\}$ optimized for the subspace quantization is configured.

16. The method of claim 14, wherein a new codebook is configured by projecting all codewords of the codebook in the null-space of $V_{ref}$.

17. A non-transitory computer readable storage medium having computer readable instructions stored thereon that, when executed by a computer, implement in a wireless communication system comprising multiple transmitters each having multiple transmit antennas, a method for operating a receiver having multiple receive antennas to process a signal from a first affiliated transmitter and align interference from a second interfering transmitter, the method comprising:

providing a codebook comprising predefined matrices in the receiver, each predefined matrix having an identifier associated therewith;

assembling a first channel matrix and a second channel matrix for the first affiliated transmitter and the interfering transmitters, respectively;

determining an equivalent direct channel matrix from the assembled first and second channel matrices;

selecting predetermined reference vectors from a plurality of predetermined vectors;

selecting a predefined matrix from the codebook based upon the equivalent direct channel matrix;

feeding back to the first affiliated transmitter an identifier for the selected predefined matrix; and receiving a signal, and decoding the signal using a combining matrix derived from the predetermined reference vectors and an inverse of the second channel matrix, thereby reducing interference from the interfering transmitters, wherein:

the receiver is a rank d receiver having K receive antennas;

the first affiliated transmitter and second interfering transmitters each have M transmit antennas;

the equivalent direct channel matrix is computed from the first and second channel matrices and d predetermined reference vectors V ref selected from a plurality of M predetermined vectors;

the codebook comprising predefined matrices is also provided to the transmitters;

the selected predefined matrix represents an estimate of the computed equivalent direct channel matrix; and a combining matrix is applied to decode rank d data signals received at the receiver, where the combining matrix is derived from the d predetermined reference vectors and an inverse of the second channel matrix to project all cross channels from the second interfering transmitter to the d predetermined reference vectors to reduce or eliminate interference from the second interfering transmitter.

18. The computer readable storage medium of claim 17, wherein assembling the first channel matrix and the second channel matrix comprises:
receiving pilot signals from the first affiliated transmitter and the second interfering transmitter; and
determining a direct channel matrix H for the first affiliated transmitter and a cross channel matrix G for the second interfering transmitter based on the pilot signals.

19. The computer readable storage medium of claim 17, wherein computing the equivalent direct channel matrix comprises computing a product of a complex transpose of predetermined reference vector or a matrix with d predetermined reference vectors and an inverse of the second channel matrix $G^+$ and the first channel matrix H.

20. The computer readable storage medium of claim 17, wherein the fed back matrix selected from a codebook is one that is closest to the computed equivalent direct channel matrix.

21. The computer readable storage medium of claim 17, wherein the fed back matrix selected from a codebook matrix is one with which a spanned subspace is closest to a subspace spanned by the computed equivalent direct channel matrix.

22. The computer readable storage medium of claim 17, wherein the method further comprises estimating signal to interference plus noise ratio (SINR) using the following equation:

$$SINR_{i,j} \approx \frac{1}{d_j^i} \left| I + \frac{SNR}{L_i} H_{i,j}^{eq} P_{d_j^i}^{i,j} P_{d_j^i}^{i,jH} H_{i,j}^{eqH} \left( \text{Cov}(n_{i,j}^{eq}) + \frac{SNR}{L_i} H_{i,j}^{eq} \Psi_{d_j^i}^{i,j} \Psi_{d_j^i}^{i,jH} H_{i,j}^{eqH} \right)^{-1} \right| - 1;$$

where $$\Psi_{d_j^i}^{i,j}$$

denotes the null space of $$P_{d_j^i}^{i,j}.$$

23. The computer readable storage medium of claim 17, wherein for a case of K>M, the combining matrix is derived in accordance with the following expression:

$$R_{i,j} = \left( I + \frac{INR}{L_i} G_{3-i,j}(I - V_{ref}^H V_{ref}) G_{3-i,j}^H \right)^{-1} H_{i,j}(I - V_{ref}^H V_{ref}) H_{i,j}^H,$$

$$\text{where } V_{ref} \triangleq \begin{bmatrix} v_{ref}^1 & v_{ref}^2 & \ldots & v_{ref}^{d_{max}^{3-i}} \end{bmatrix}^T.$$

24. The computer readable storage medium of claim 17, further comprising performing the feedback by sub-space quantization such that a transmitted signal is always in the null space of $V_{ref}$.

25. The computer readable storage medium of claim 24, further comprising configuring a new codebook $P_r = \{P_r^1, \ldots, P_r^{M_r}\}$ optimized for the subspace quantization.

26. The computer readable storage medium of claim 24, further comprising configuring a new codebook by projecting all codewords of the codebook in the null-space of $V_{ref}$.

27. A non-transitory computer readable storage medium having computer readable instructions stored thereon that, when executed by a computer, implement in a wireless communication system comprising multiple transmitters each having multiple transmit antennas, a method for transmitting a signal from a first transmitter to a receiver having multiple receive antennas, the method comprising:
acquiring, at the first transmitter, an identifier for a selected predefined matrix from a codebook, wherein the matrix represents an estimate of a determined equivalent direct channel matrix from each of the multiple receivers;
obtaining a second transmitter maximum rank value from a second transmitter which corresponds to a maximum transmission rank for any receiver affiliated with the second transmitter;
selecting a subset of the multiple receivers and corresponding ranks for each selected receiver to receive a signal from the first transmitter such that the number of M transmit antennas is not less than a sum of the corresponding ranks plus the second transmitter maximum rank; and
computing a precoding matrix using the acquired matrix selected from the codebook and one or more predefined reference vectors for a signal to be transmitted to the selected subset of receivers to reduce or eliminate interference to any receivers receiving signals from the first transmitter or from the second transmitter,
wherein the selected subset of receivers are those that result in a lower rank for interference subspace.

28. The computer readable storage medium of claim 26, wherein the selected subset of receivers are those that have a same reference vector or vectors, or have or part of a same reference vector or vectors.

29. The computer readable storage medium of claim 26, wherein the selected subset of receivers select a reference vector from among a defined set.

30. The computer readable storage medium of claim 26, wherein the acquired matrix is fed back by sub-space quantization such that the signal to be transmitted is always in the null space of the one or more predefined reference vectors $V_{ref}$.

31. The computer readable storage medium of claim 30, wherein a new codebook $P_r = \{P_r^1, \ldots, P_r^{M_r}\}$ optimized for the subspace quantization is configured.

32. The computer readable storage medium of claim 30, wherein a new codebook is configured by projecting all codewords of the codebook in the null-space of $V_{ref}$.

33. A user equipment (UE) device configured to align interference and receive signaling over first and second channels from a first affiliated transmitter and a second interfering transmitter, comprising:
an array of receive antennas configured to receive one or more signals over first and second channels from the first and second transmitters; and
a processor configured to:
assemble a first channel matrix and a second channel matrix for the first affiliated transmitter and the second interfering transmitter, respectively;
determine an equivalent direct channel matrix from the assembled first and second channel matrices;

select predetermined reference vectors from a plurality of predetermined vectors;

select, from a codebook, a predefined matrix based upon the equivalent direct channel matrix, the codebook comprising predefined matrices in the receiver, each predefined matrix having an identifier associated therewith;

feed back to the first affiliated transmitter an identifier for the selected predefined matrix; and receive a signal, and decode the signal using a combining matrix derived from the predetermined reference vectors and an inverse of the second channel matrix, thereby reducing interference from the interfering transmitters, wherein:

the receiver is a rank d receiver having K receive antennas;

the first affiliated transmitter and second interfering transmitters each have M transmit antennas;

the equivalent direct channel matrix is computed from the first and second channel matrices and d predetermined reference vectors V ref selected from a plurality of M predetermined vectors;

the codebook comprising predefined matrices is also provided to the transmitters;

the selected predefined matrix represents an estimate of the computed equivalent direct channel matrix; and a combining matrix is applied to decode rank d data signals received at the receiver, where the combining matrix is derived from the d predetermined reference vectors and an inverse of the second channel matrix to project all cross channels from the second interfering transmitter to the d predetermined reference vectors to reduce or eliminate interference from the second interfering transmitter.

34. The UE device of claim 33, wherein assembling the first channel matrix and the second channel matrix comprises:

receiving pilot signals from the first affiliated transmitter and the second interfering transmitter; and determining a direct channel matrix H for the first affiliated transmitter and a cross channel matrix G for the second interfering transmitter based on the pilot signals.

35. The UE device of claim 33, wherein computing the equivalent direct channel matrix comprises computing a product of a complex transpose of predetermined reference vector or a matrix with d predetermined reference vectors and an inverse of the second channel matrix $G^+$ and the first channel matrix H.

36. The UE device of claim 33, wherein the fed back matrix selected from a codebook is one that is closest to the computed equivalent direct channel matrix.

37. The UE device of claim 33, wherein the fed back matrix selected from a codebook matrix is one with which a spanned subspace is closest to a subspace spanned by the computed equivalent direct channel matrix.

38. The UE device of claim 33, wherein the processor is further configured to estimate signal to interference plus noise ratio (SINR) using the following equation:

$$SINR_{i,j} \approx \frac{1}{d_j^i}\left|I + \frac{SNR}{L_i}H_{i,j}^{eq}P_{d_j^i}^{i,j}P_{d_j^i}^{i,jH}H_{i,j}^{eqH}\left(\text{Cov}(n_{i,j}^{eq}) + \frac{SNR}{L_i}H_{i,j}^{eq}\Psi_{d_j^i}^{i,j}\Psi_{d_j^i}^{i,jH}H_{i,j}^{eqH}\right)^{-1}\right| - 1;$$

where $$\Psi_{d_j^i}^{i,j}$$

denotes me nun space or $$P_{d_j^i}^{i,j}.$$

39. The UE device of claim 33, wherein for a case of K≥M, the combining matrix is derived in accordance with the following expression:

$$R_{i,j} = \left(I + \frac{INR}{L_i}G_{3-i,j}(I - V_{ref}^H V_{ref})G_{3-i,j}^H\right)^{-1} H_{i,j}(I - V_{ref}^H V_{ref})H_{i,j}^H,$$

$$\text{where } V_{ref} \triangleq \begin{bmatrix} v_{ref}^1 & v_{ref}^2 & \ldots & v_{ref}^{d_{max}^{3-i}} \end{bmatrix}^T.$$

40. The UE device of claim 33, wherein the feedback is performed by sub-space quantization such that a transmitted signal is always in the null space of $V_{ref}$.

41. The UE device of claim 40, wherein a new codebook $P_r=\{P_r^1, \ldots, P_r^{M_r}\}$ optimized for the subspace quantization is configured.

42. The UE device of claim 40, wherein a new codebook is configured by projecting all codewords of the codebook in the null-space of $V_{ref}$.

* * * * *

UNITED STATES PATENT AND TRADEMARK OFFICE
CERTIFICATE OF CORRECTION

PATENT NO. : 8,964,871 B2
APPLICATION NO. : 13/739420
DATED : February 24, 2015
INVENTOR(S) : Amin Mobasher et al.

It is certified that error appears in the above-identified patent and that said Letters Patent is hereby corrected as shown below:

In The Claims

Column 34, Claim 1, Line 41 replace "V ref" with --V_ref--

Column 36, Claim 12, Line 11 the claim reference numeral "10" should appear as --11--; Claim 13, Line 14 the claim reference numeral "10" should appear as --11--; Claim 14, Line 16 the claim reference numeral "10" should appear as --11--; Claim 17, Line 59 replace "V ref" with --V_ref--

Column 37, Claim 23, Line 54 replace "K>M" with --K≥M--

Column 38, Claim 28, Line 37 the claim reference numeral "26" should appear as --27--; Claim 29, Line 41 the claim reference numeral "26" should appear as --27--; Claim 30, Line 44 the claim reference numeral "26" should appear as --27--

Column 39, Claim 33, Line 19 replace "V ref" with --V_Ref--

Column 40, Claim 38, Line 22 should read as follows --denotes the null space of--

Signed and Sealed this
Eighth Day of December, 2015

Michelle K. Lee
*Director of the United States Patent and Trademark Office*